US006624372B1

United States Patent
Ogawa et al.

(10) Patent No.: US 6,624,372 B1
(45) Date of Patent: Sep. 23, 2003

(54) GAS INSULATED SWITCHGEAR

(75) Inventors: Takemasa Ogawa, Hitachi (JP);
Kazuhiko Takahashi, Hitachi (JP);
Mamoru Okabe, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/806,910

(22) PCT Filed: Mar. 31, 1999

(86) PCT No.: PCT/JP99/01674
§ 371 (c)(1),
(2), (4) Date: Apr. 6, 2001

(87) PCT Pub. No.: WO00/22708
PCT Pub. Date: Apr. 20, 2000

(30) Foreign Application Priority Data

Oct. 13, 1998 (JP) ............................................. 10-290291

(51) Int. Cl.[7] ............................................. H01M 33/70
(52) U.S. Cl. ............................................. 218/71; 218/67
(58) Field of Search ...................... 218/2, 7, 14, 10–12, 218/67–71

(56) References Cited

U.S. PATENT DOCUMENTS

| | | | | | |
|---|---|---|---|---|---|
| 4,013,853 A | * | 3/1977 | Alverson et al. | ............... | 218/7 |
| 4,024,365 A | * | 5/1977 | Soles et al. | .................... | 218/70 |
| 4,788,392 A | * | 11/1988 | Asai | .............................. | 218/2 |
| 5,484,972 A | * | 1/1996 | Tecchio | ........................ | 218/70 |
| 5,589,674 A | * | 12/1996 | Berger et al. | .................. | 218/71 |
| 5,991,148 A | * | 11/1999 | Heil et al. | ..................... | 218/75 |

* cited by examiner

Primary Examiner—Lincoln Donovan
(74) Attorney, Agent, or Firm—Mattingly, Stanger & Malur, P.C.

(57) ABSTRACT

A gas insulation switchgear having a lowered overall height is provided. The height of the gas insulation switchgear can be lowered by constructing the gas insulation switchgear so as to comprise a breaker unit 13 horizontally arranged in the lower side and containing a conductor for one phase in a container; an actuator 41 arranged in the axial direction of the breaker unit 13; and a main bus isolator unit 4 horizontally arranged in both sides of a bus side connecting conductor 46 through the bus side connecting conductor 46 arranged vertically and connected to the breaker unit 13.

8 Claims, 21 Drawing Sheets

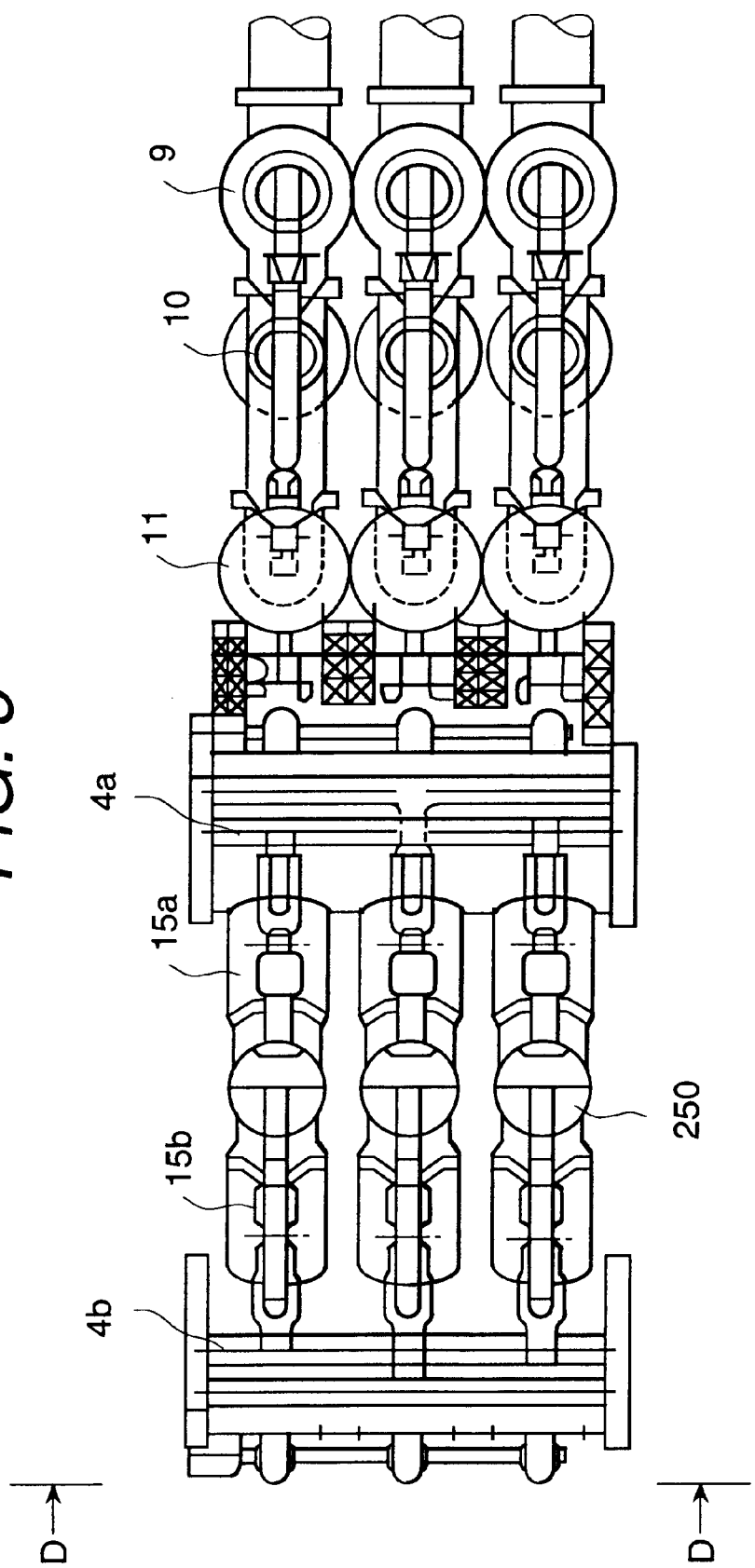

# GAS INSULATED SWITCHGEAR

FIELD OF THE INVENTION

The present invention relates to a gas insulation switchgear and, more particularly a gas insulation switchgear suitable for small sizing.

BACKGROUND OF THE INVENTION

Gas insulation switchgears are widely installed in substations and the like because they are good in insulating performance, suitable for a small-sized machine, and safe. The gas insulation switchgear is a system which comprises a plurality of enclosed containers, each of the enclosed containers contains a breaker, an isolator, a grounding switch, an instrumental current transformer and current conducting conductors for electrically connecting these components and is filled with an insulation gas.

The insulator of such a gas switchgear is constructed so that a movable contact is detached from a main circuit by driving a mechanism portion and an insulation rod by an actuator arranged outside the tank. As described in the Transactions of 1997 National Meeting of the Institute of Electrical Engineers of Japan, Paper No. 1584, pages 382–383, there is a gas insulation switchgear in which a bus is disposed in the bottom, a pole gap is disposed above the bus, a driving portion is disposed above the pole gap, and a conductor in the same phase as a movable contact connected to an insulation rod is penetrated.

Further, there is a gas insulation switchgear, as disclosed in Japanese Patent Application Laid-Open No. 49-78850, in which a three-phase single-unit transformer capsule of a horizontal type is connected to a three-phase single-unit breaker of a horizontal type, a three-phase single-unit connection capsule of a vertical type is connected to the three-phase single-unit transformer capsule, and three-phase single-unit buses are connected to the left-hand side and the right-hand side of the connection capsule through a three-phase single-unit isolator.

In a case where the three-phase single-unit gas insulation switchgear as described in the Transactions of 1997 National Meeting of the Institute of Electrical Engineers of Japan, Paper No. 1584, pages 382–383 is used, and the main circuit is led out in the horizontal direction from the bus isolator, the insulation spacers are horizontally arranged in the isolator and accordingly there is a problem in that metallic extraneous objects are accumulated on the insulation spacers to reduce the reliability. Further, as described in the Transactions of 1997 National Meeting of the Institute of Electrical Engineers of Japan, Paper No. 1584, page 392, there is a problem in that an installation height becomes high in the structure of a phase separation type isolator because three conductors are vertically arranged inside an isolator tank and the main bus containers should be vertically installed in order to construct the phase separation type isolator though the main circuits can be led out in the horizontal direction.

In the gas insulation switchgear disclosed in Japanese Patent Application Laid-Open No. 49-78850, the height of the gas insulation switchgear can not lowered because the breakers, the transformer capsules and the isolators are constructed in the three-phase single-unit type, and consequently the outer diameters of the breaker, the transformer capsule and the isolator become larger.

A first object of the present invention is to provide a gas insulation switchgear in which the height of the whole system is lowered.

A second object of the present invention is to provide a gas insulation switchgear which is suitable for arranging the insulation spacers in the vertical direction.

A third object of the present invention is to provide a gas insulation switchgear which is suitable for transporting the gas insulation switchgear composing the transmission line in a unit.

A fourth object of the present invention is to provide a gas insulation switchgear which is suitable for performing inspection.

SUMMARY OF THE INVENTION

The objects described above can be attained by a gas insulation switchgear in accordance with the present invention comprising a breaker unit horizontally arranged and containing a conductor for one phase in a container; a bus side connecting conductor vertically arranged and connected to the breaker; three-phase single-unit type main bus units arranged in both sides of the bus side connecting conductor and in an axial direction of said breaker unit; and a line side connecting conductor connected to the breaker unit.

Further, a gas insulation switchgear in accordance with the present invention comprises a breaker unit horizontally arranged and containing a conductor for one phase in a container; a bus side connecting conductor vertically arranged and connected to the breaker; a three-phase single-unit type main bus A connected to the bus side connecting conductor; a line side connecting conductor connected to the breaker unit; and a three-phase single-unit type main bus B connected to the line side connecting conductor, wherein a connecting port to the main bus A of the bus side connecting conductor and a connecting port to the main bus B of the line side connecting conductor are arranged in the same direction.

Further, a gas insulation switchgear in accordance with the present invention comprises a breaker unit having a bus section line and a bus communication line horizontally arranged, containing a conductor for one phase in a container; a bus side connecting conductor vertically arranged and connected to the breaker; three-phase single-unit type main bus units arranged in both sides of the bus side connecting conductor and in an axial direction of the breaker unit; and a line side connecting conductor connected to the breaker units.

Further, in a substation comprising a transmission line, a bus communication line, a bus section line and a transformer line, a gas insulation switchgear in accordance with the present invention has a voltage transformer unit in the bus section line.

Further, a gas insulation switchgear in accordance with the present invention comprises a breaker unit having a bus section line horizontally arranged, containing a conductor for one phase in a container; a bus side connecting conductor vertically arranged and connected to the breaker; three-phase single-unit type main bus units arranged in both sides of the bus side connecting conductor and in an axial direction of said breaker unit; a line side connecting conductor connected to the breaker units; and a voltage transformer connected to an end portion of the main bus.

Further, in the gas insulation switchgear in accordance with the present invention, the line side conductor has an isolator unit, and the breaker unit and the isolator unit are mounted on a base, and a portion between the breaker unit and the bus side connecting conductor and a portion between the breaker unit and the isolator unit are so constructed as to be separable.

Further, in the gas insulation switchgear in accordance with the present invention, a second base is arranged below the base described above.

Further, a gas insulation switchgear in accordance with the present invention comprises a breaker unit horizontally arranged and containing a conductor for one phase in a container; a bus side connecting conductor vertically arranged and connected to the breaker; three-phase single-unit type main bus units arranged in both sides of the bus side connecting conductor and in an axial direction of the breaker unit; and a line side connecting conductor connected to the breaker unit, the breaker unit and the isolator unit being mounted on a base, a portion between the breaker unit and the bus side connecting conductor and a portion between the breaker unit and the line side connecting conductor being so constructed as to be separable, wherein the gas insulation switchgear is transported as a unit when the gas insulation switchgear is transported, and the gas insulation switchgear is mounted on a second base.

Further, in the gas insulation switchgear in accordance with the present invention, when the breaker unit is disassembled, the breaker unit is dismounted by supporting the main bus unit with the other support column, and detaching the portion between the breaker unit and the bus side connecting conductor and the portion between the breaker unit and the line side connecting conductor after removing the second base.

Further, a gas insulation switchgear in accordance with the present invention comprises a breaker unit horizontally arranged; a bus side connecting conductor vertically arranged and connected to the breaker; a current transformer unit arranged below the bus side connecting conductor; three-phase single-unit type main bus units arranged in both sides of the bus side connecting conductor and in an axial direction of the breaker unit; and a line side connecting conductor connected to the breaker unit.

Further, in the gas insulation switchgear in accordance with the present invention, a current transformer unit is connected to the breaker unit, and the breaker unit, the bus side connecting conductor and the current transformer are so constructed as to have a common gas section.

Further, in the insulation switchgear in accordance with the present invention, a current transformer unit is connected to the breaker unit, and the current transformer is so constructed to have a tank different from a tank of the breaker unit.

Further, a gas insulation switchgear in accordance with the present invention comprises a breaker unit horizontally arranged; a bus side connecting conductor vertically arranged and connected to the breaker; three-phase single-unit type main bus units arranged in both sides of the bus side connecting conductor and in an axial direction of the breaker unit; and a line side connecting conductor connected to the breaker unit, wherein the line side connecting conductor is connected to a line side component through a current transformer arranged vertically and an extendable joint.

Further, in the gas insulation switchgear in accordance with the present invention, the main conductors for three phases are horizontally or vertically arranged in a row.

Further, a gas insulation switchgear in accordance with the present invention comprises a breaker unit horizontally arranged; a bus side connecting conductor vertically arranged and connected to the breaker; three-phase single-unit type main bus units arranged in both sides of the bus side connecting conductor and in an axial direction of the breaker unit; and a line side connecting conductor connected to the breaker unit, wherein an insulation spacer is horizontally arranged between the line side connecting conductor and the breaker unit, and a grounding device is arranged in the main bus unit.

Further, a gas insulation switchgear in accordance with the present invention comprises a breaker unit horizontally arranged; a bus side connecting conductor vertically arranged and connected to the breaker; three-phase single-unit type main bus units arranged in both sides of the bus side connecting conductor and in an axial direction of the breaker unit; and a line side connecting conductor connected to the breaker unit, wherein the line side connecting conductor is connected to a breaker side grounding device, an isolator and a line side isolator which are contained in a container vertically arranged.

BRIEF DESCRIPTION OF DRAWINGS

FIG. 5 is a plan view showing an embodiment of a gas insulation switchgear in accordance with the present invention.

DESCRIPTION OF THE PREFERRED EMBODIMENTS

Figure 1:
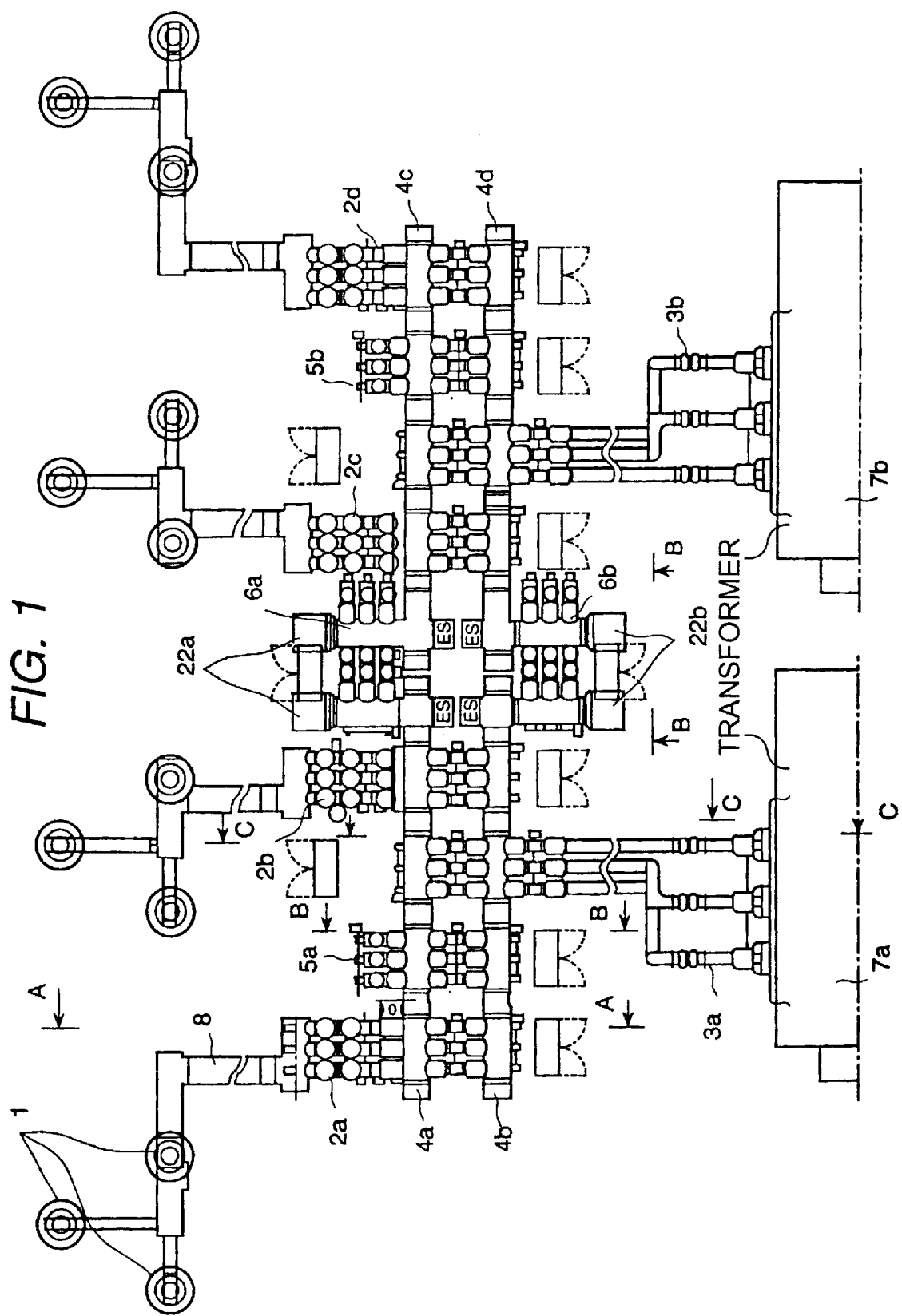
FIG. 1 is a plan view showing an embodiment of a gas insulation switchgear in accordance with the present invention which is installed at a substation.
Figure 2:
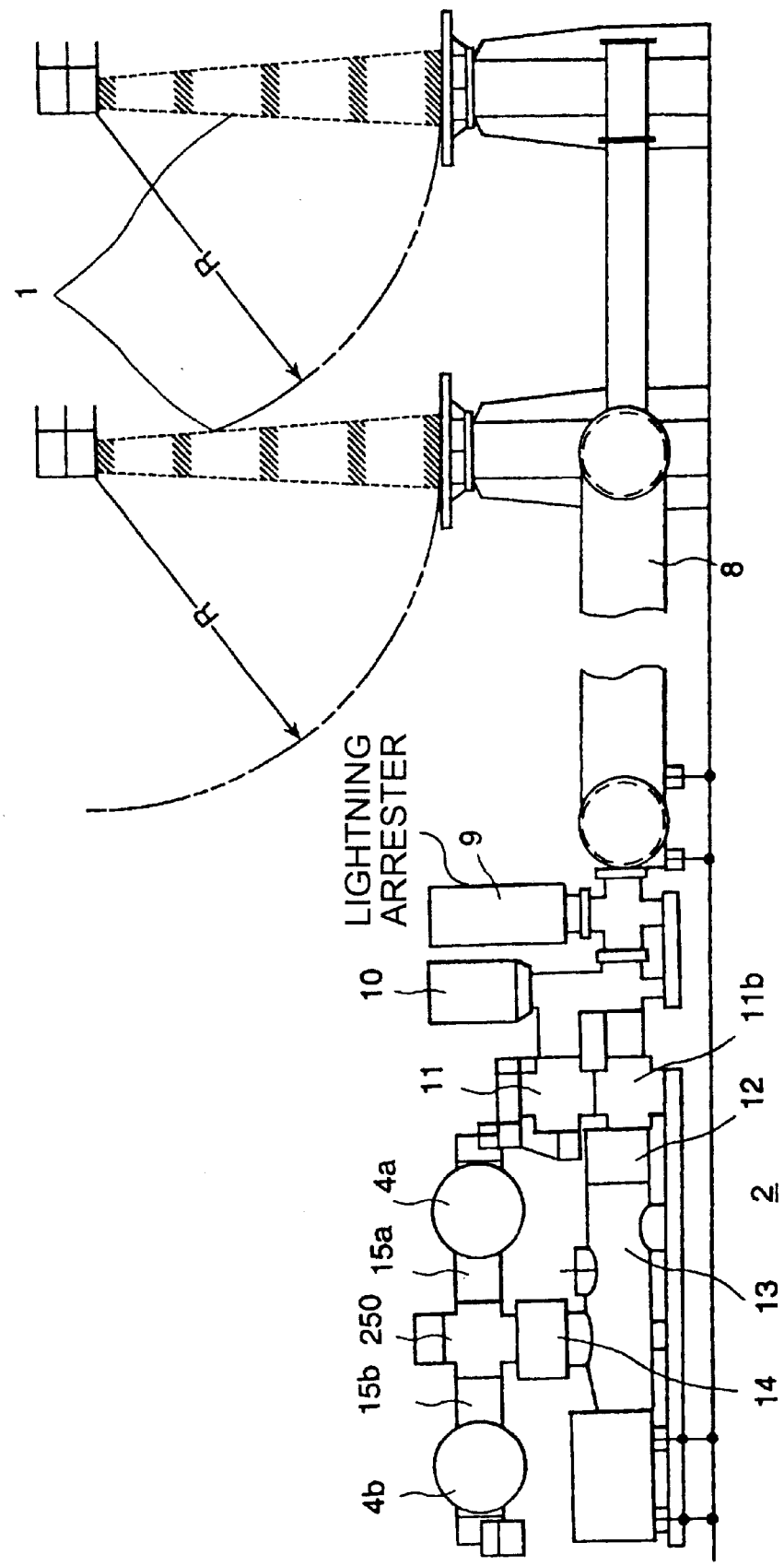
FIG. 2 is a side view showing the gas insulation switchgear being taken on the plane of the line A—A of FIG.
Figure 3:
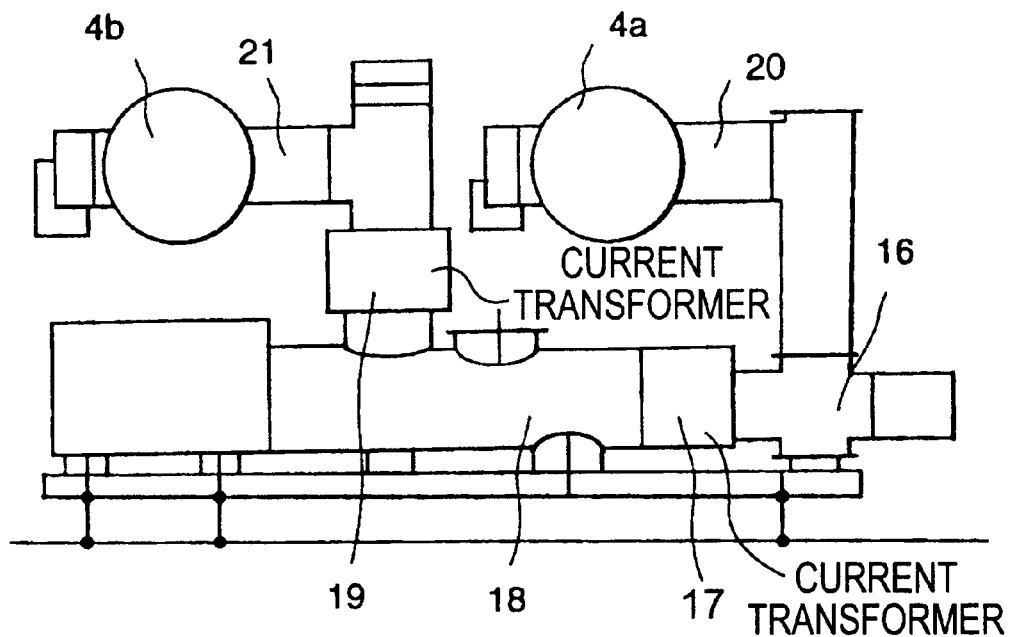
FIG. 3 is a side view showing the gas insulation switchgear being taken on the plane of the line B—B of FIG.1.
Figure 6:
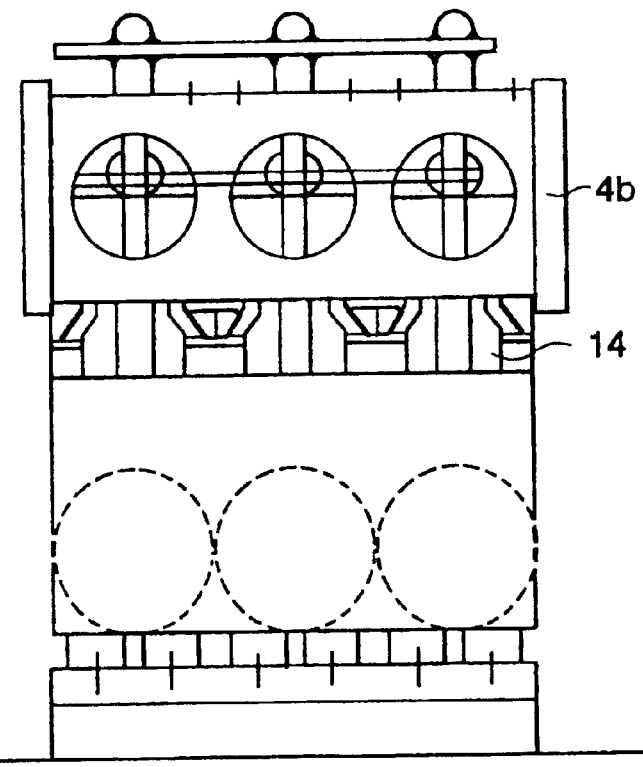
FIG. 6 is a front view showing the gas insulation switchgear being taken on the plane of the line D—D of FIG. 5.
Figure 4:
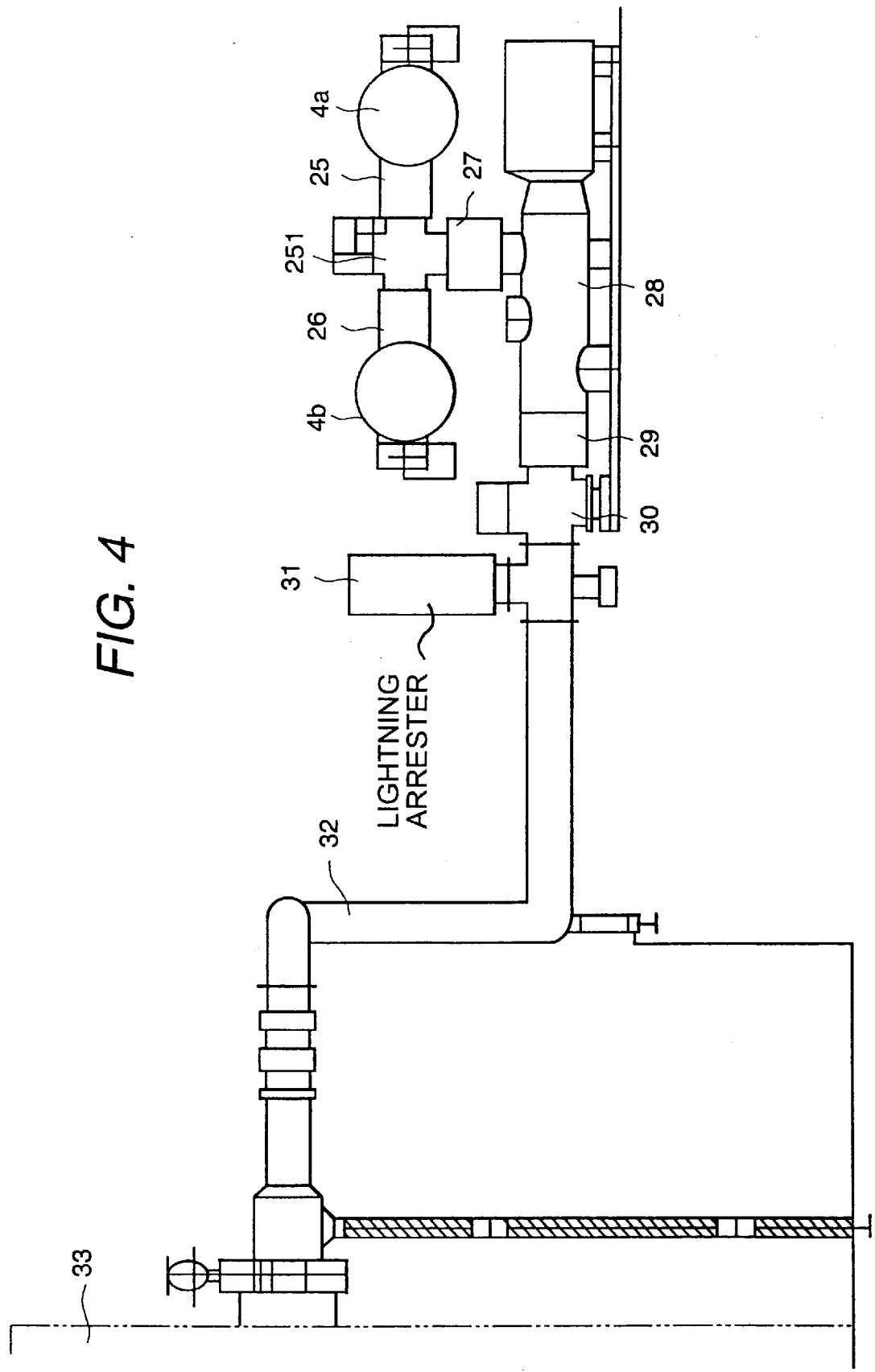
FIG. 4 is a side view showing the gas insulation switchgear being taken on the plane of the line C—C of FIG.1.
Figure 7:
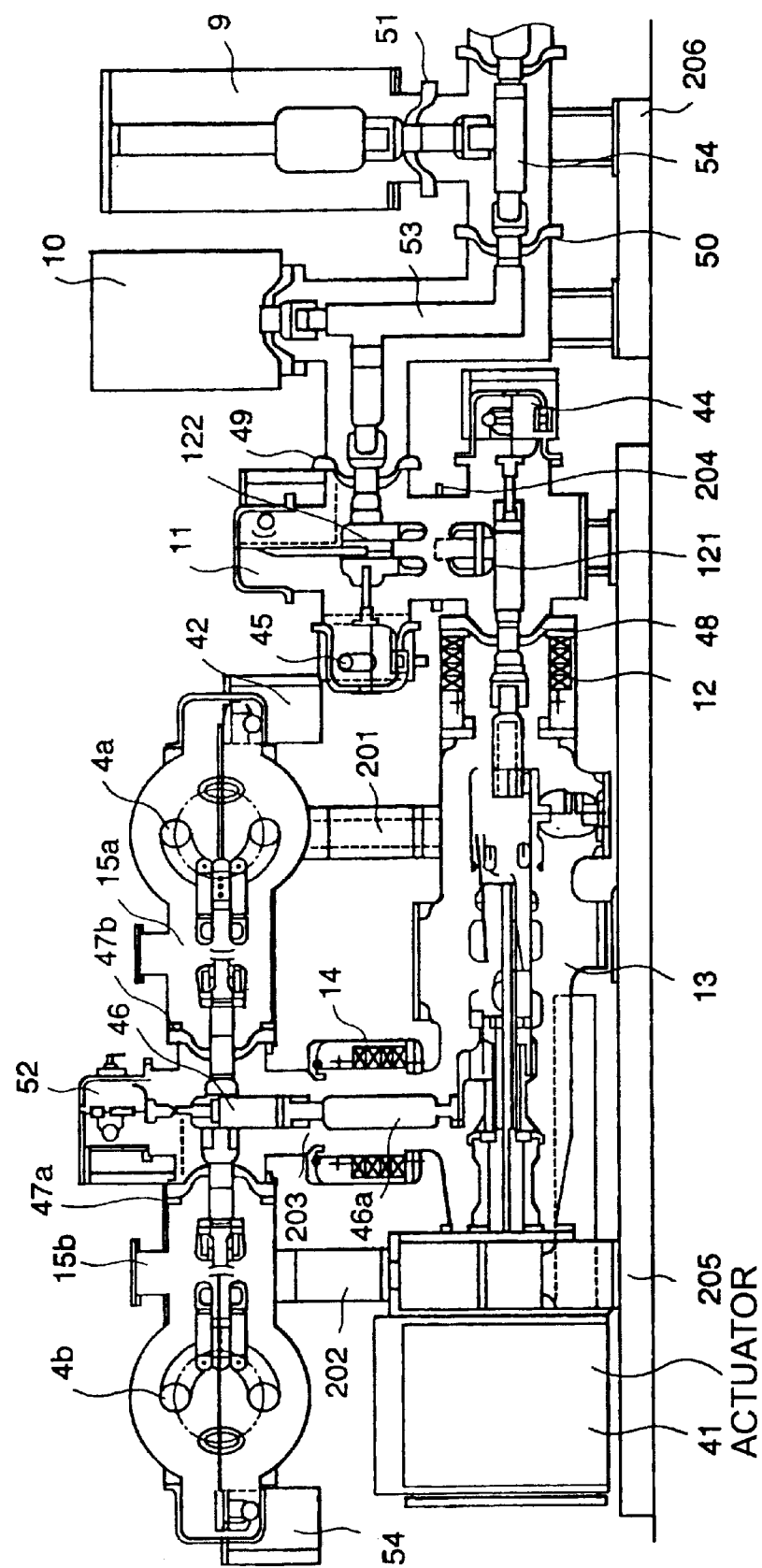
FIG. 7 is a longitudinal sectional view showing a gas insulation switchgear used in an electric power transmission line.
Figure 8:
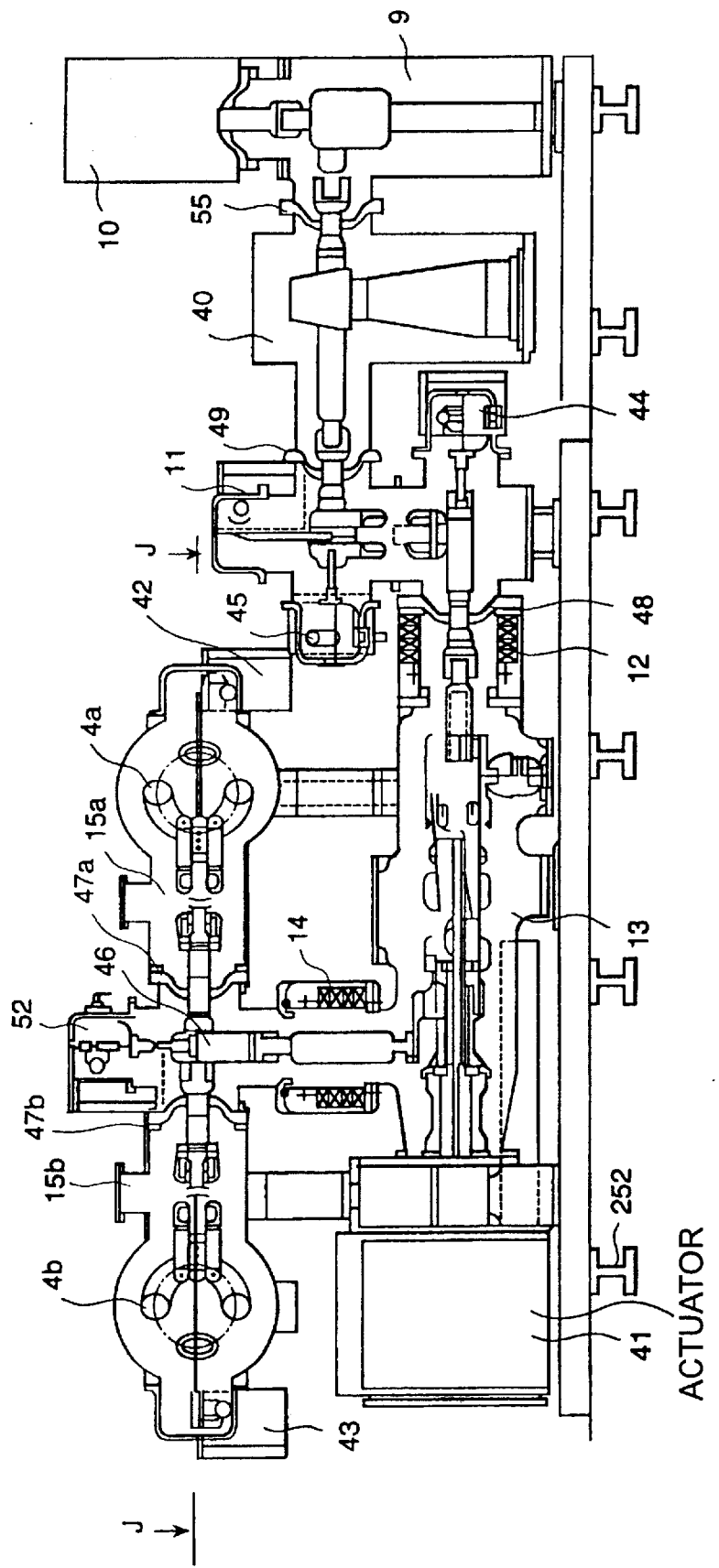
FIG. 8 is a longitudinal sectional view showing another embodiment different from the gas insulation switchgear of FIG. 7.
Figure 9:
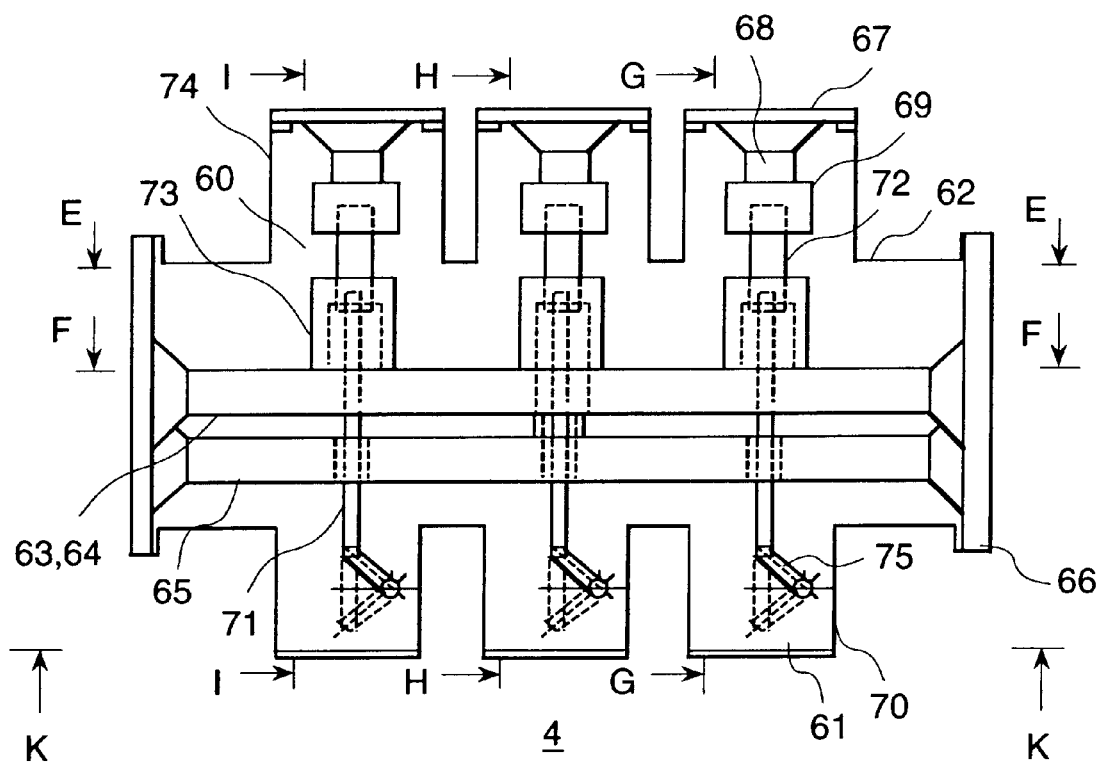
FIG. 9 is a transverse sectional view showing a bus line isolator.
Figure 10:
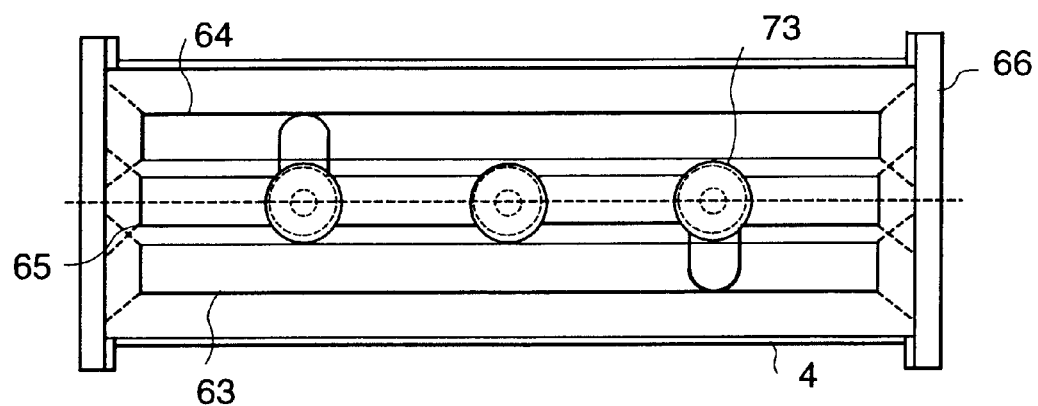
FIG. 10 is a cross-sectional view showing the bus line isolator being taken on the plane of the line E—E of FIG. 9.
Figure 11:
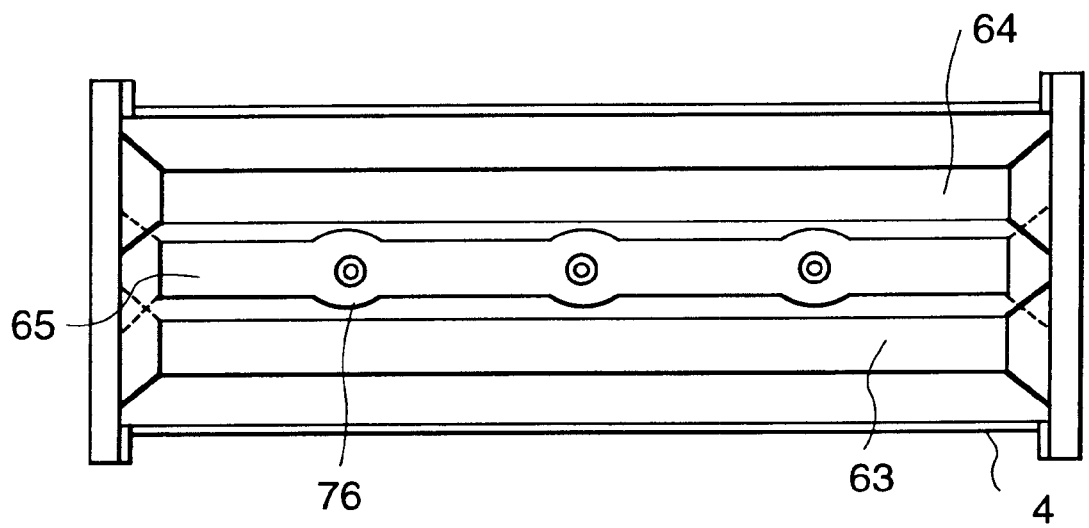
FIG. 11 is a cross-sectional view showing the bus line isolator being taken on the plane of the line F—F of FIG. 9.
Figure 12:
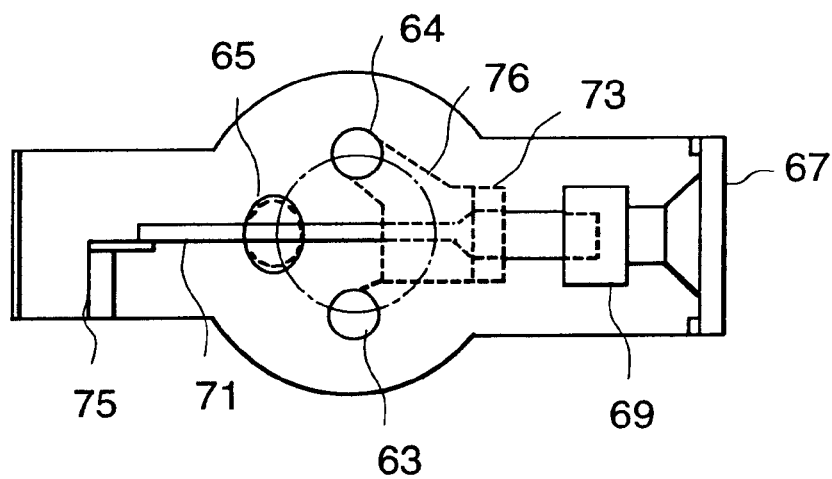
FIG. 12 is a cross-sectional view showing the bus line isolator being taken on the plane of the line G—G of FIG. 9.
Figure 13:
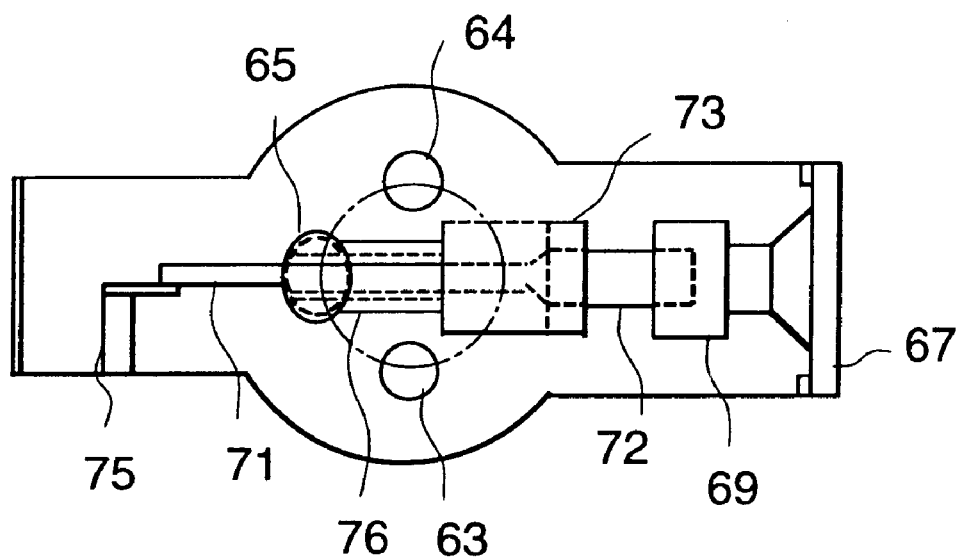
FIG. 13 is a cross-sectional view showing the bus line isolator being taken on the plane of the line H—H of FIG. 9.
Figure 14:
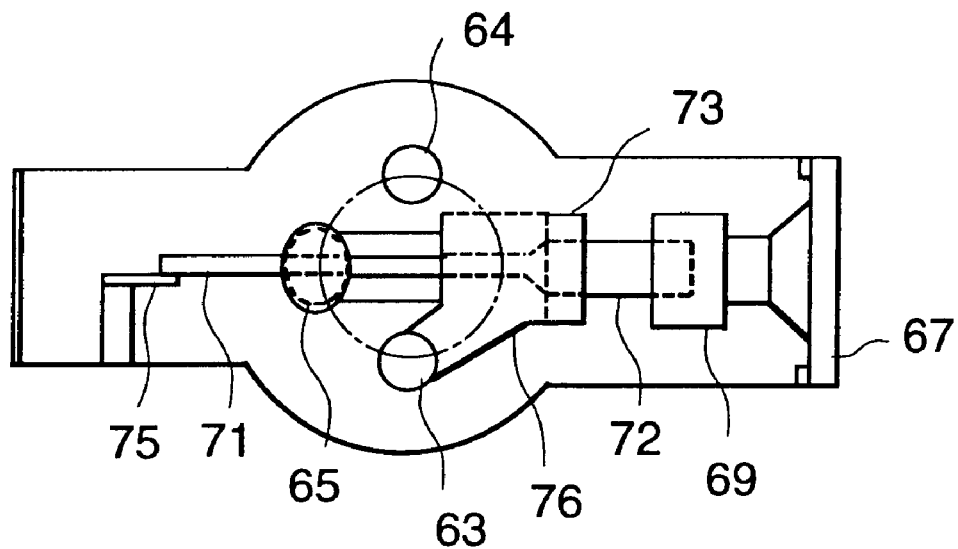
FIG. 14 is a cross-sectional view showing the bus line isolator being taken on the plane of the line I—I of FIG. 9.
Figure 15:
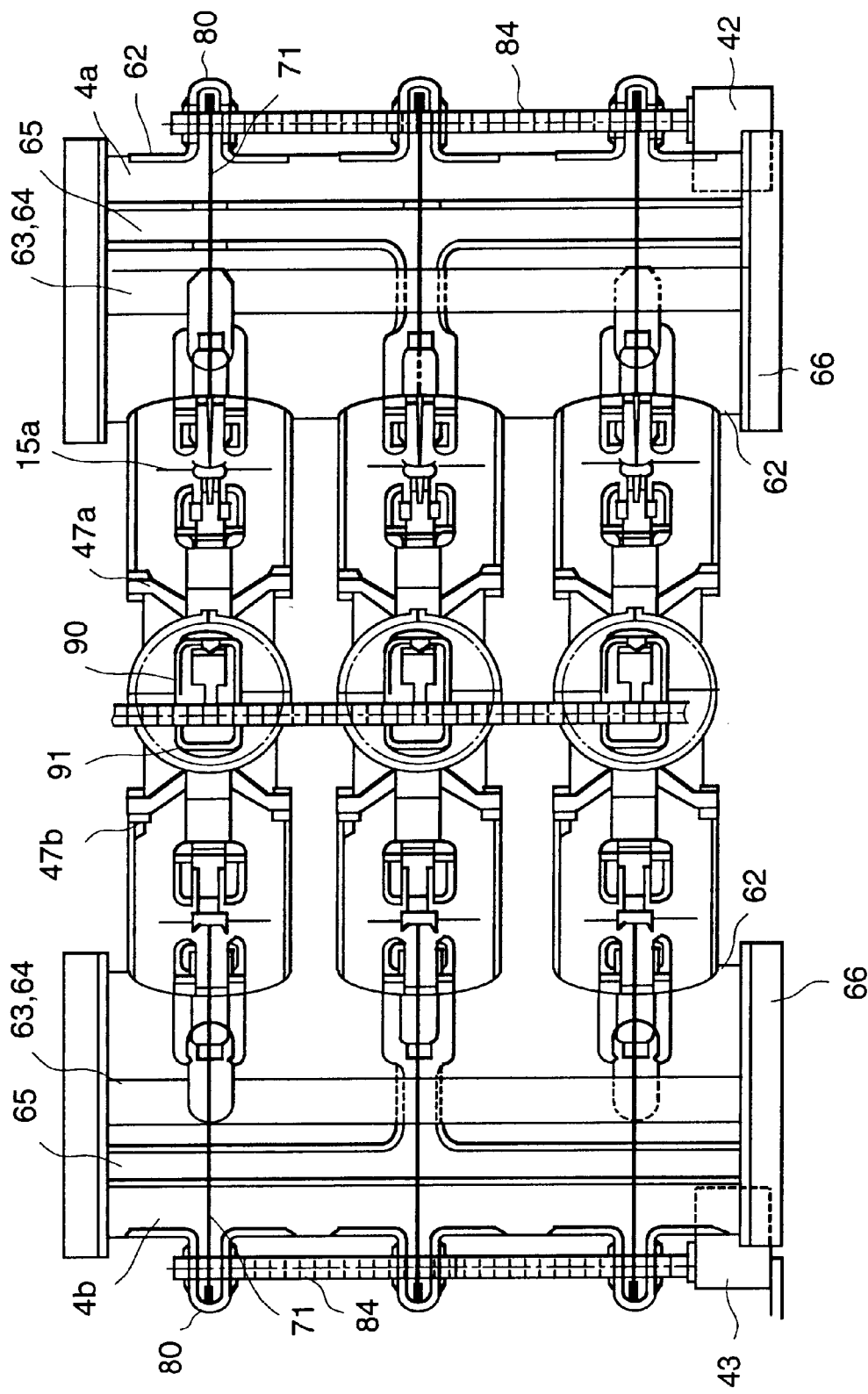
FIG. 15 is a transverse partially sectional view showing a gas insulation switchgear.
Figure 16:
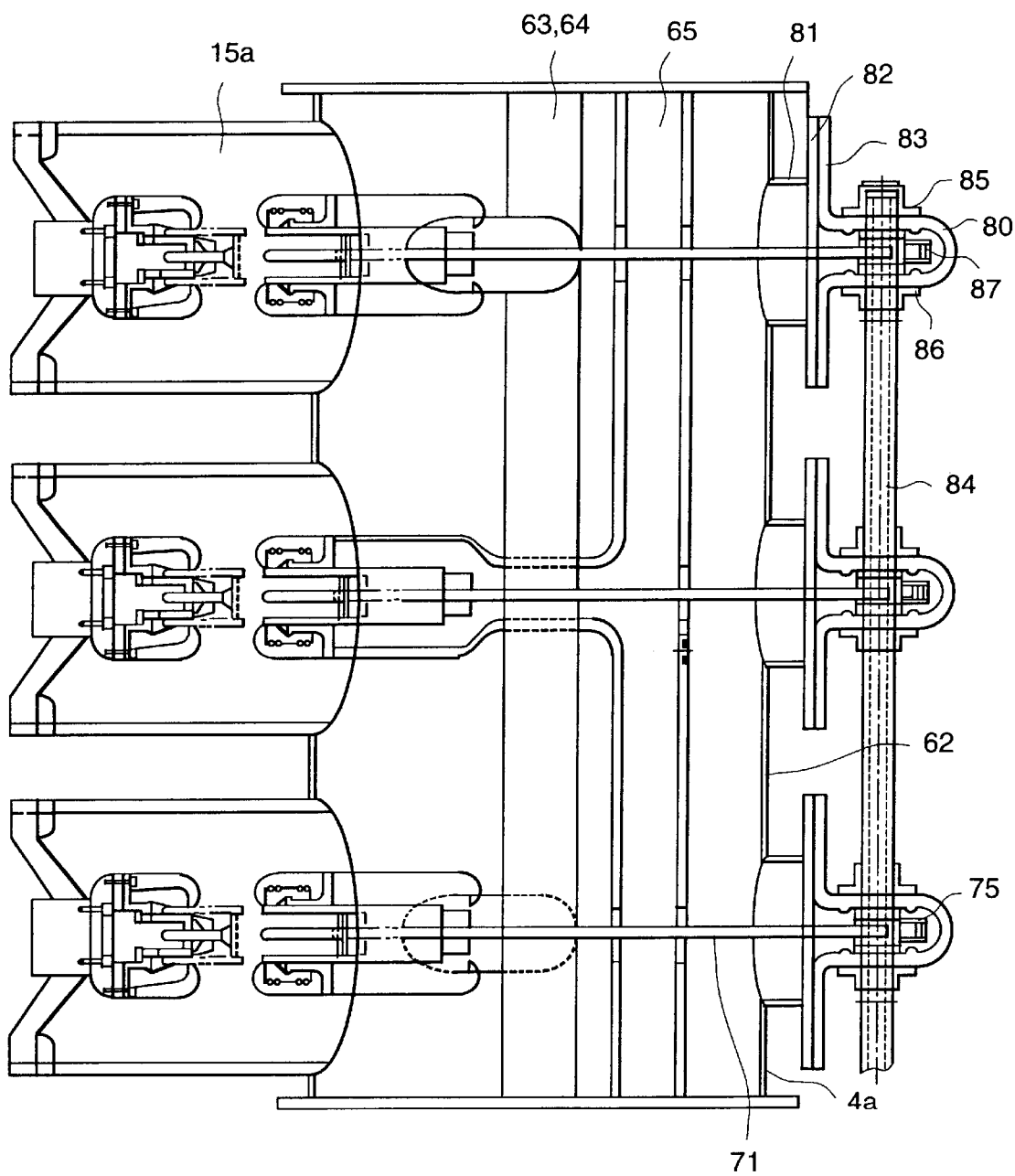
FIG. 16 is a longitudinal partially sectional view showing a gas insulation switchgear.
Figure 17:
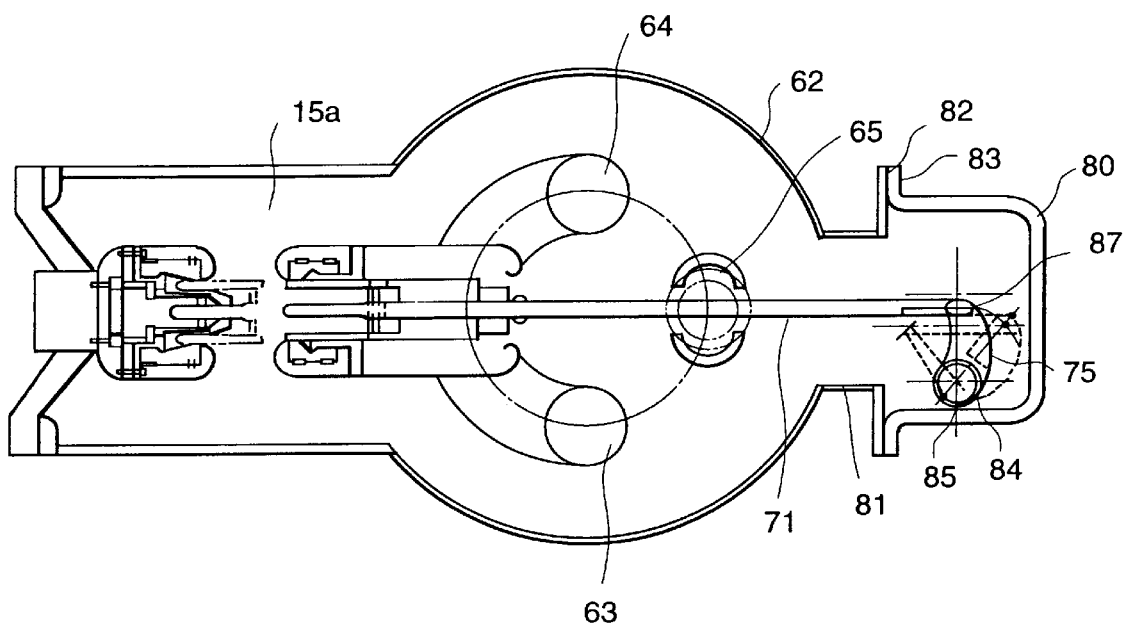
FIG. 17 is an enlarged longitudinal sectional view showing a main bus isolator.
Figure 18:
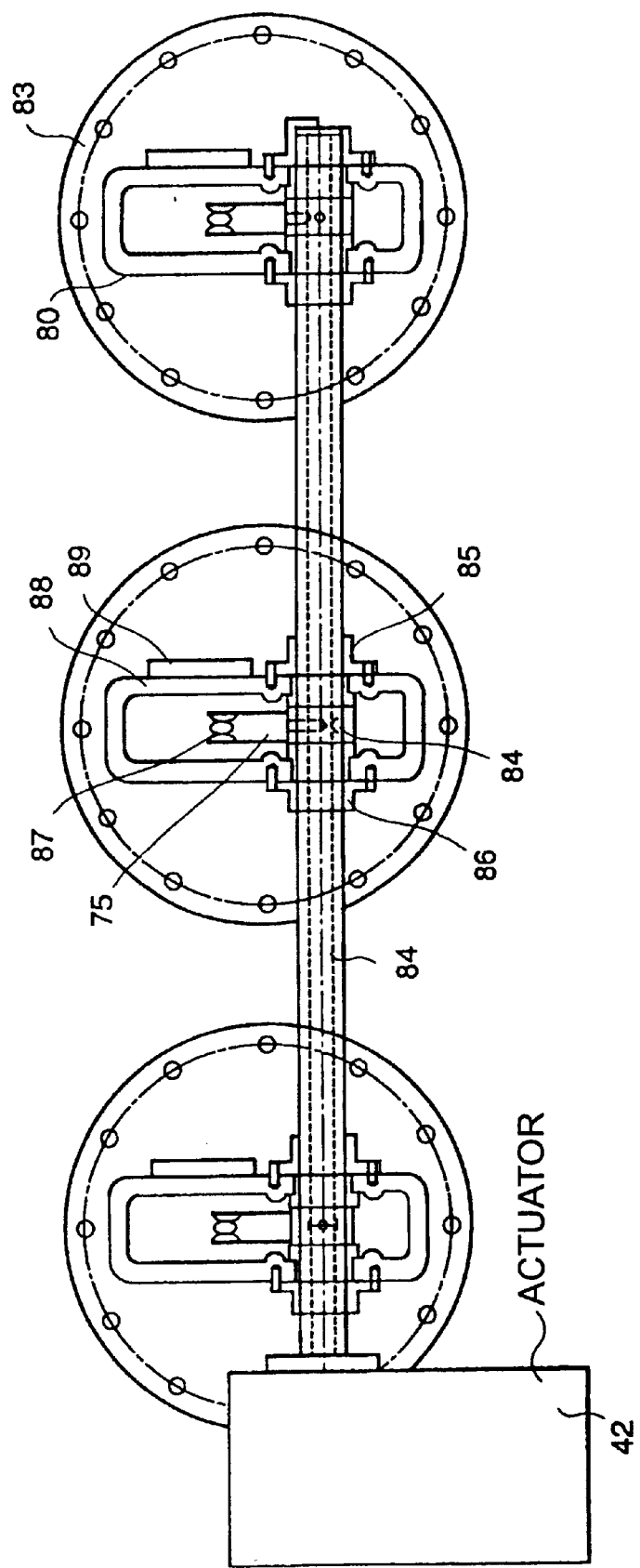
FIG. 18 is an enlarged side view showing an operating mechanism portion.
Figure 19:
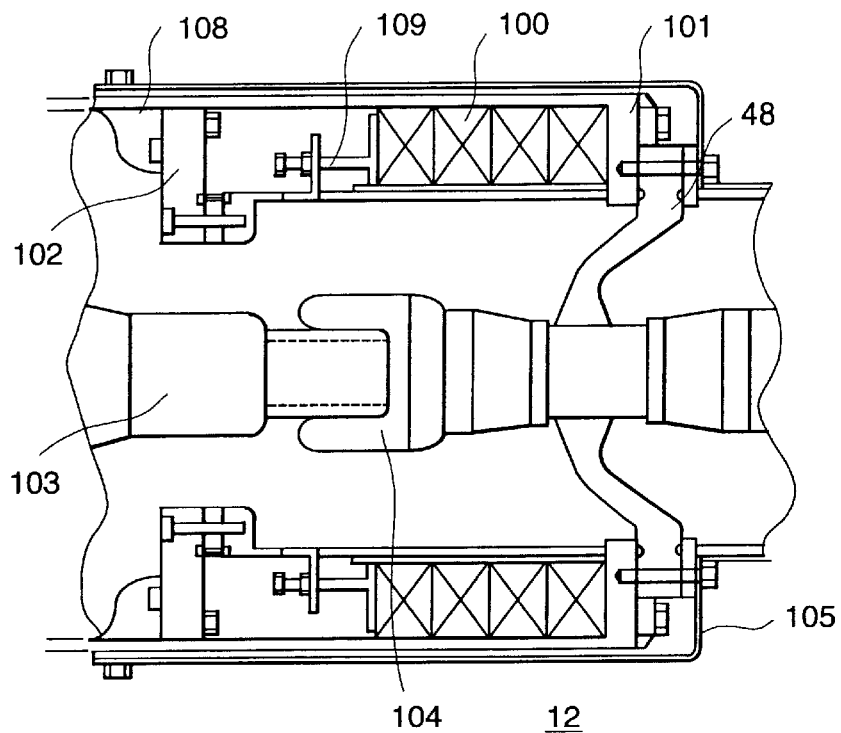
FIG. 19 is an enlarged longitudinal sectional view showing a current transformer unit.
Figure 20:
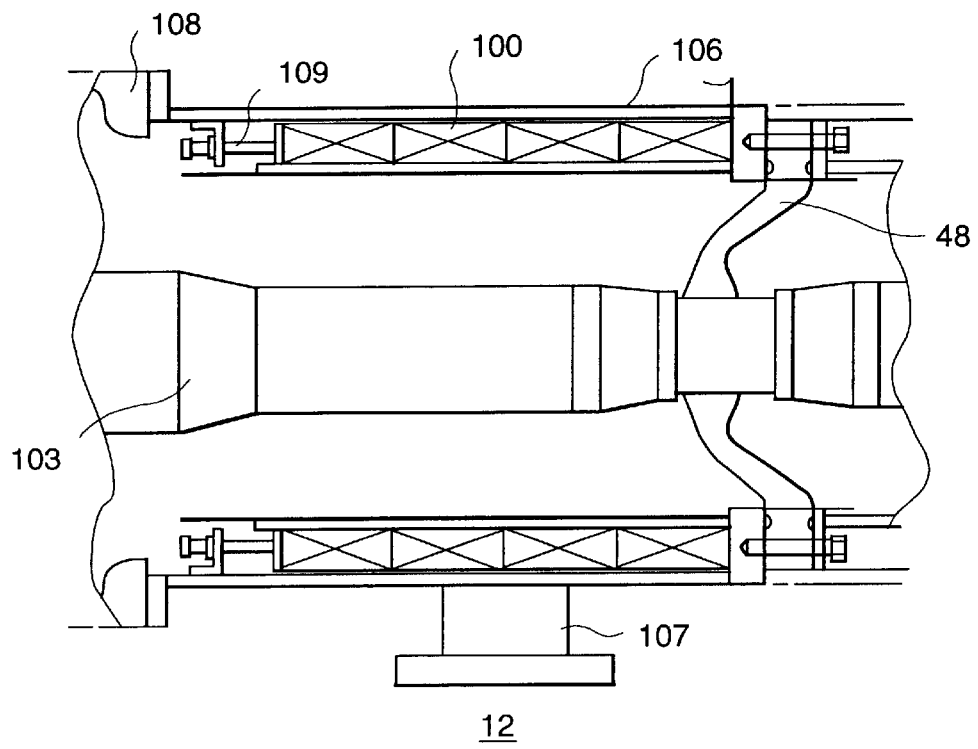
FIG. 20 is an enlarged longitudinal sectional view showing a current transformer unit.
Figure 21:
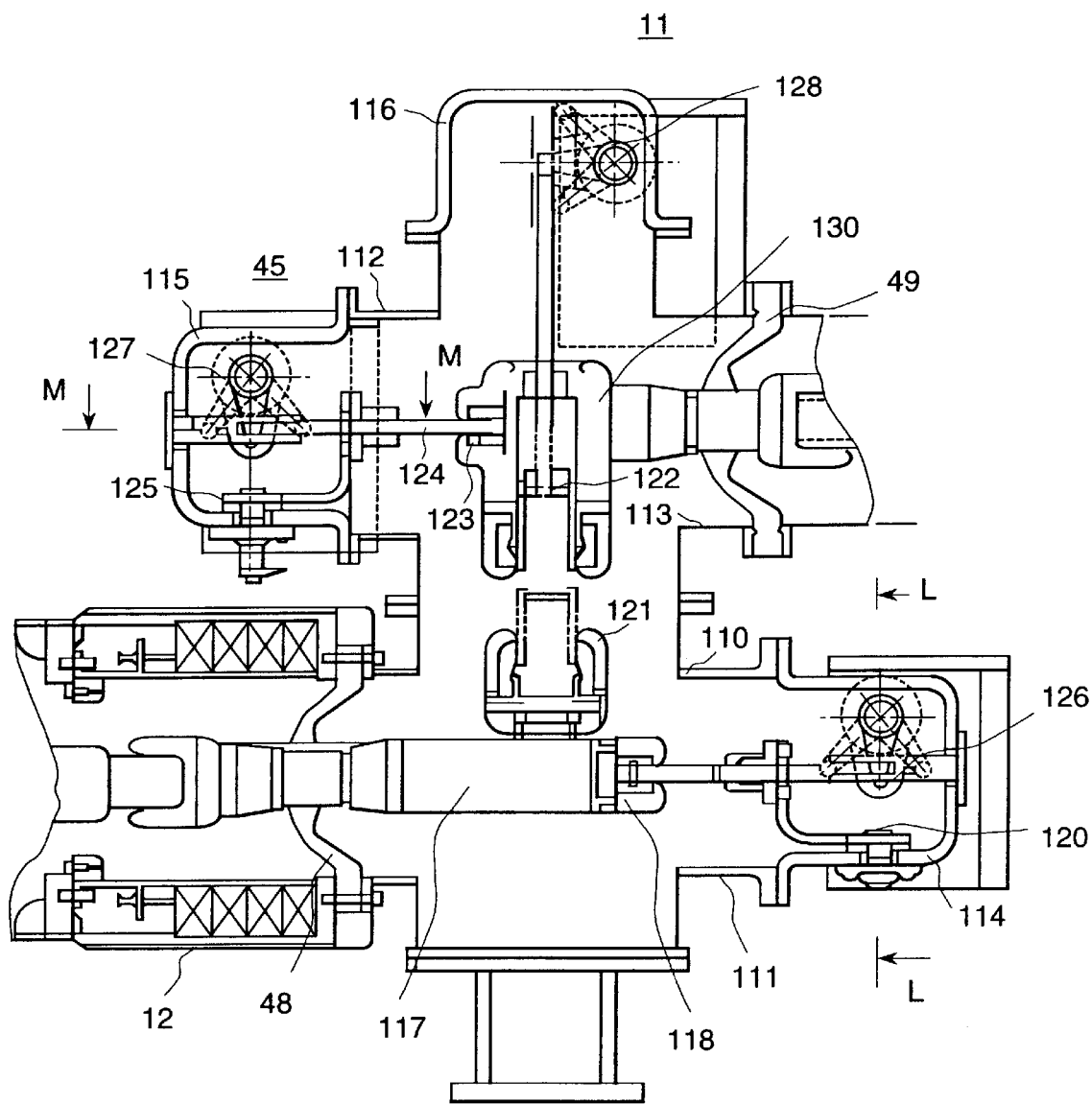
FIG. 21 is an enlarged longitudinal partially sectional view showing an isolator unit.
Figure 22:
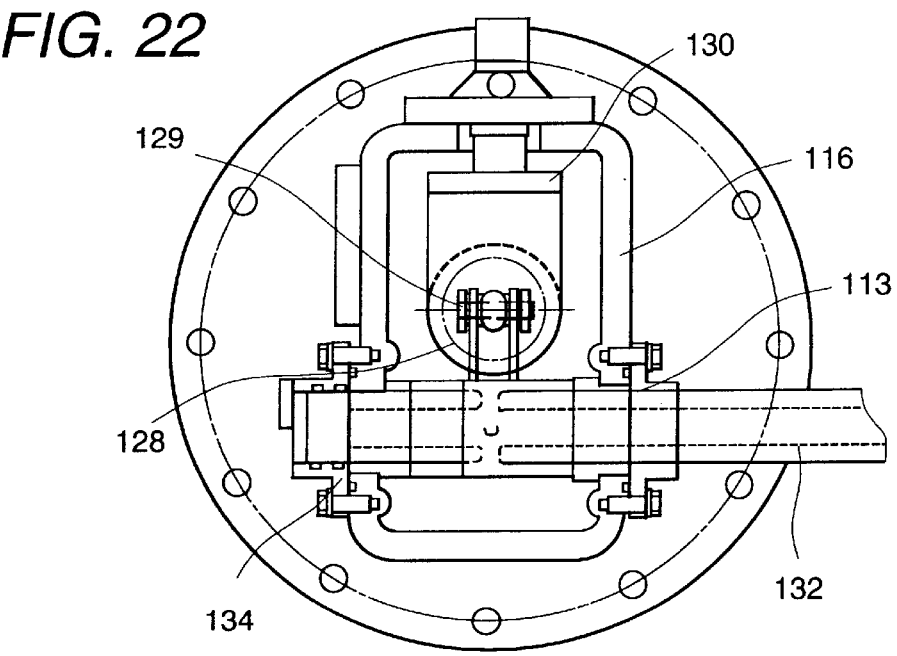
FIG. 22 is an enlarged plan view showing an operating mechanism portion of the isolator.
Figure 23:
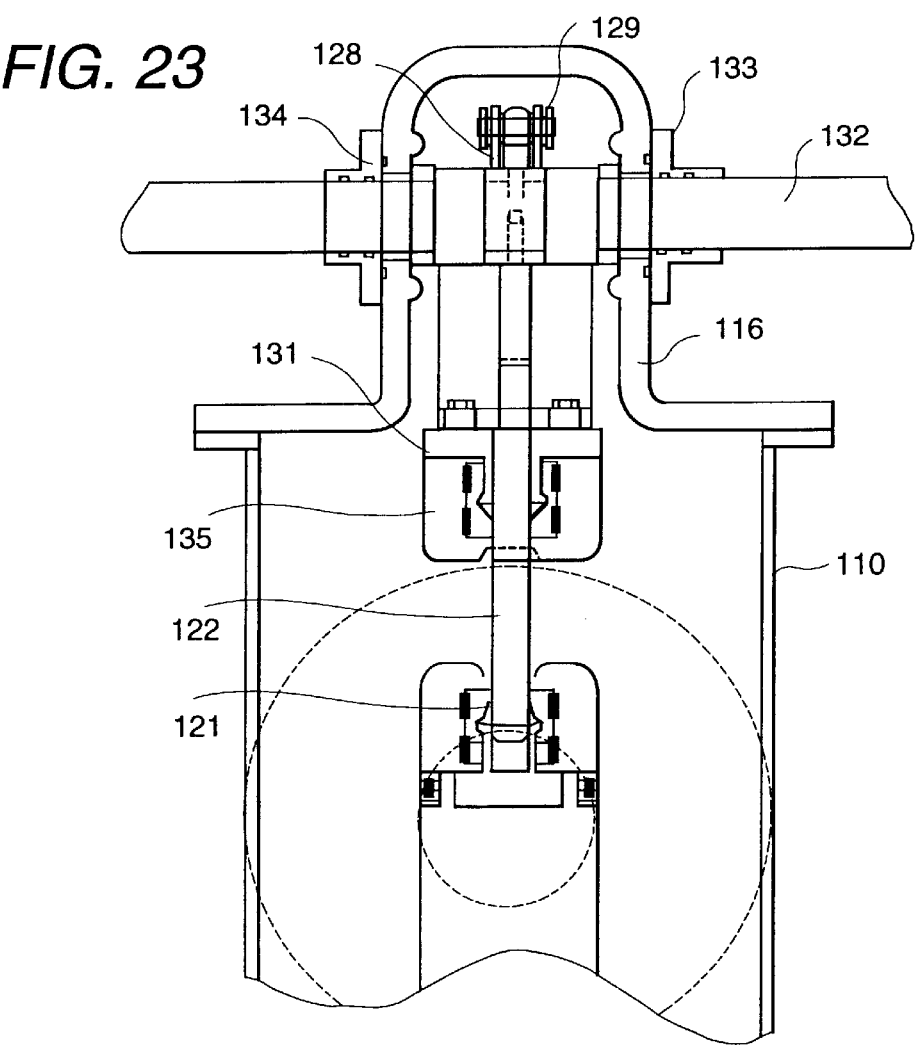
FIG. 23 is an enlarged longitudinal partially sectional view showing the operating mechanism portion of the isolator.
Figure 24:
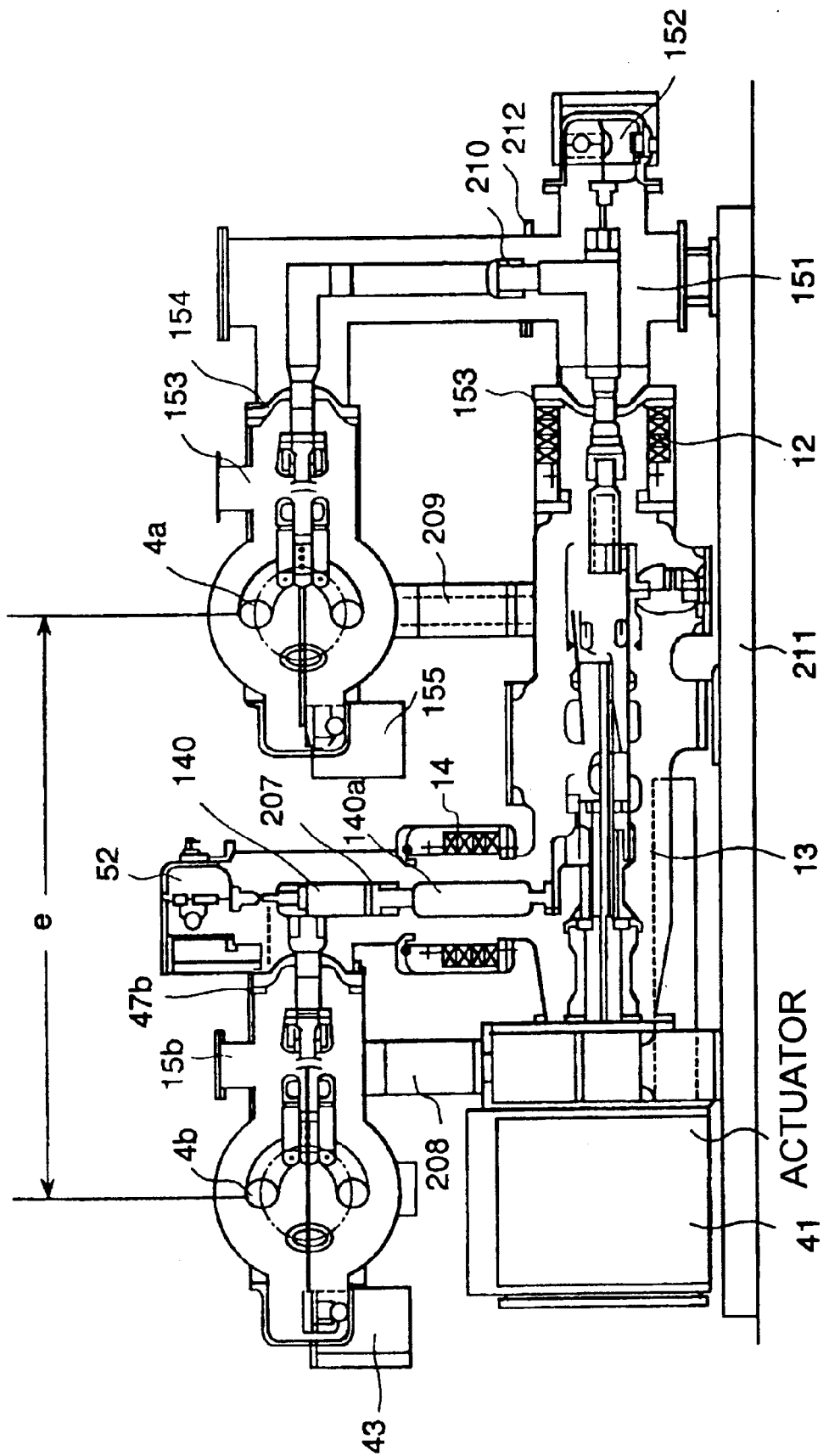
FIG. 24 is a longitudinal sectional view showing a gas insulation switchgear for bus line communication.
Figure 25:
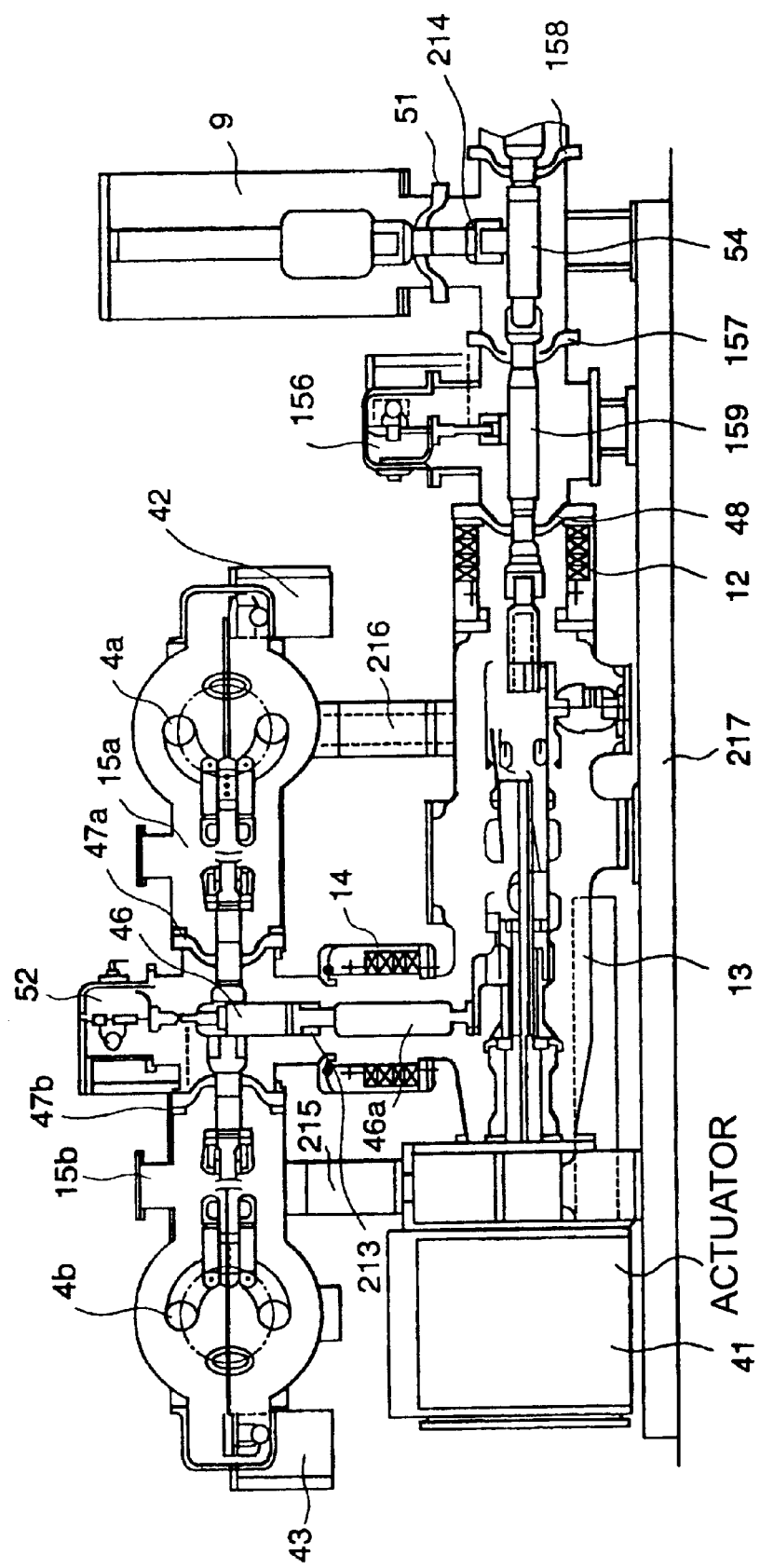
FIG. 25 is a longitudinal sectional view showing a gas insulation switchgear for transformer circuit.

An embodiment of the present invention will be described below, referring to FIG. 1 to FIG. 25. FIG. 1 is a plan view showing an embodiment of a gas insulation switchgear in accordance with the present invention which is installed at a substation; FIG. 2 is a side view showing the gas insulation switchgear being taken on the plane of the line A—A of FIG. 1; FIG. 3 is a side view showing the gas insulation switchgear being taken on the plane of the line B—B of FIG. 1; FIG. 4 is a side view showing the gas insulation switchgear being taken on the plane of the line C—C of FIG. 1; FIG. 5 is a plan view showing the gas insulation switchgear shown in FIG. 2; FIG. 6 is a front view showing the gas insulation switchgear being taken on the plane of the line D—D of FIG. 5; FIG. 7 is a longitudinal sectional view showing the gas insulation switchgear shown in FIG. 2 which is used in an electric power transmission line; FIG. 8 is a longitudinal sectional view showing another embodiment different from the gas insulation switchgear of FIG. 7; FIG. 9 is a transverse sectional view showing a bus line isolator; FIG. 10 is a cross-sectional view showing the bus line isolator being taken on the plane of the line E—E of FIG. 9; FIG. 11 is a cross-sectional view showing the bus line isolator being taken on the plane of the line F—F of FIG. 9; FIG. 12 is a cross-sectional view showing the bus line isolator being taken on the plane of the line G—G of FIG. 9; FIG. 13 is a cross-sectional view showing the bus line isolator being taken on the plane of the line H—H of FIG. 9; FIG. 14 is a cross-sectional view showing the bus line isolator being taken on the plane of the line I—I of FIG. 9; FIG. 15 is a transverse partially sectional view showing the gas insulation switchgear being taken on the plane of the line J—J of FIG. 8; FIG. 16 is an enlarged longitudinal partially sectional view showing the gas insulation switchgear shown in FIG. 15; FIG. 17 is an enlarged longitudinal sectional view showing the main bus isolator shown in FIG. 12; FIG. 18 is an enlarged side view showing the operating mechanism portion being taken on the plane of the line K—K of FIG. 9; FIG. 19 is an enlarged longitudinal sectional view showing the current transformer unit shown in FIG. 17; FIG. 20 is an enlarged longitudinal sectional view showing a current transformer unit; FIG. 21 is an enlarged longitudinal partially sectional view showing the isolator unit shown in FIG. 7; FIG. 22 is an enlarged plan view showing the operating mechanism portion of the isolator being taken on the plane of the line L—L of FIG. 21; FIG. 23 is an enlarged longitudinal partially sectional view showing the operating mechanism portion of the isolator being taken on the plane of the line M—M of FIG. 21; FIG. 24 is a longitudinal sectional view showing the gas insulation switchgear for bus line communication shown in FIG. 3; and FIG. 25 is a longitudinal sectional view showing the gas insulation switchgear for transformer circuit shown in FIG. 4.

A transmission line is connected to bushings 1 from a pylon installed in a substation. As shown in FIG. 1, in this embodiment, the transmission lines 2 are four lines, and the transformer lines 3 are two lines. In regard to main buses 4, the two main buses of main buses A 4a, 4d and main buses B 4b, 4c are arranged nearly in parallel to each other. A bus communication line 5a and a transformer line 3a are successively connected to the main buses 4a, 4b between the transmission line 2a and the transmission line 2b, and the transformer line 3a is connected to a transformer 7a. Bus section lines 6a, 6b are arranged in the main buses 4a, 4b, 4c, 4d between the transmission line 2b and the transmission line 2c. A transformer line 3b and a bus communication line 5b are successively connected to the main buses 4c, 4d between the transmission line 2c and the transmission line 2d, and the transformer line 3b is connected to a transformer 7b.

As shown in FIG. 2, a three-phase single-unit bus 8 is connected between the bushing 1 and the transmission line 2. The bus 8 is separated into each phase to be connected to the transmission line 2. The bus 8 is successively connected to a lightning arrester 9 gas-sectioned, a voltage transformer unit 10 gas-sectioned, isolator units 11a, 11b gas-sectioned together with a grounding device, a current transformer unit 12, a breaker unit 13, a current transformer unit 14, and two main bus isolator units 15a, 15b arranged in a branch portion 250 from the main bus 4.

As shown in FIG. 3, the bus communication line 5 is constructed by successively connecting a main bus isolator unit 20, a grounding device unit 16, a current transformer 17, a breaker unit 18, a current transformer 19 and a main bus isolator unit 21 to the main bus 4a, and the main bus isolator unit 21 is connected to the main bus 4b. These units are arranged in a line, and the connecting ports are arranged in the same direction.

As shown in FIG. 4, the transformer line 3 is constructed by connecting main bus isolator units 25, 26 to the main buses 4a, 4b, respectively, and connecting the main bus isolator units 25, 26 to a branch portion 251, and successively connecting a current transformer 27, a breaker unit 28, a current transformer 29, a grounding device unit 30, a lighting arrester 31 and a bus 32 to the branch portion 251, and the bus 32 is connected to a transformer 33.

The bus section lines 6 are arranged at a central side between the main buses 4a, 4b and at a central side between two main buses 4b, 4d, and constructed similarly to the bus communication line 5 shown in FIG. 3. The two buses 4a, 4c are connected with the bus section line 6a, and the two buses 4b, 4d are connected with the bus section line 6b. As shown in FIG. 1, Voltage transformers 22a, 22b are arranged at the other ends of the branching buses of the bus section lines 6a, 6b in the same horizontal level as the main bus 4 is arranged.

The voltage transformer units 22a, 22b are arranged at a level nearly equal to the level of the main bus 4 in a direction perpendicular to the axes of the main buses 4a, 4b, 4c, 4d of the bus section line 6. Therefore, a space between the transmission line 2b and the transmission line 2c can be reduced, and the voltage transformer units do not need to be arranged at positions other than the main buses 4a, 4b, 4c, 4d, and accordingly the length of the main buses 4a, 4b, 4c, 4d can be shortened. Further, since the gas insulation switchgear using the bus communication line in the bus section line, the commonality of components can be performed. Furthermore, by arranging the axis of the bus section line 18 in parallel to the main buses 4a to 4d, the distance between the transmission lines 2b and 2c can be shortened.

The gas insulation switchgear comprising the transmission lines, the bus communication lines, the bus section lines and the transformer lines of two-line system as described above can be installed an installation area within about 13 m width and about 30 m length.

Gas insulation switchgears for three phases installed in parallel are constructed as shown in FIG. 5 and FIG. 6. Phase conductors of the three-phase single-unit main buses 4a, 4b combining and containing three-phase conductors positioned at vertexes of a triangle together in a container are connected to the main bus isolator units 15a, 15b through a branching A portion to form respective phase lines. The gas insulation switchgears composing the three-phase lines may be arranged in parallel so that the containers having a larger outer diameter out of, for example, the actuators or the breaker units are in contacting with each other, or may be arranged in parallel so that the containers are closely spaced between them.

The construction of the gas insulation switchgear used in a transmission line will be described in detail below, referring to FIG. 7 and FIG. 8. As shown in FIG. 7, a breaker unit 13 is horizontally placed in the lower side, and an actuator 41 for driving an movable contact of the breaker unit 13 is arranged in the left hand side of the breaker unit 13. A bus connecting conductor 46 is arranged above the breaker unit 13 through a current transformer unit 14 and a flange. The bus connecting conductor 46 and a conductor 46a connected to the breaker unit 13 are electrically connected with each other by a tulip contact portion 203. There is no insulation spacer in the connecting portion of the breaker unit 13, the current transformer 14 and the bus connecting conductor 46. Thereby, it is possible to prevent extraneous objects from attaching an insulation spacer even if the extraneous objects are generated by making and breaking operation of the grounding device 52. The bus connecting conductor 46 is formed in a cross-shape, and horizontally fixed and supported by insulation spacers 47a, 47b. The grounding device 52 is connected to the upper portion of the bus connecting conductor 46 through a flange. Main bus isolators 15a, 15b are arranged in the both sides of the insulation spacers 47a, 47b fixing and supporting the bus connecting conductor 46, and actuators 42, 43 for operating movable contacts provided in the main bus isolator units 15a, 15b are arranged outside the main bus isolator units 15a, 15b. An operating axis of each of the isolators for three phases is arranged on the central axis of the container, and the electrode gaps are arranged at one ends and the operating mechanism portions are arranged at the other ends interposing the conductor disposed on the central axis of the container out of the main bus 4. Detachable support columns 201, 202 are arranged between the main bus 4 and the breaker unit 13 and between the main bus isolator unit 15b and the breaker unit 13, respectively. Therefore, when the breaker unit is removed in the event of failure of the breaker unit 13, the main buses 4a, 4b and the main bus isolator units 15a, 15b can be supported by replacing the support columns 201, 202 with columns long enough to support them from the installation surface.

As described above, the main bus isolator units are horizontally arranged in parallel to each other without stacking in the vertical direction to reduce the height of the gas insulation switchgear. Since in the gas insulation switchgear in accordance with the present invention the individual phase lines are constructed from the three-phase single-unit main buses 4a, 4b, the outer diameter of the breaker unit per phase can be lessened and the outer diameter of the main isolator units can be also lessened.

Therefore, the height of the gas insulation switchgear can be lowered. For example, the height of a gas insulation switchgear of even 300 kV class can be lowered to below 2 m 70 cm, and accordingly the gas insulation switchgear can be transported by a trailer in a unit. Therefore, it is possible to reduce the transportation cost. Further, since the insulation spacers 47a, 47b can be vertically arranged, accumulation of metallic extraneous objects in the surfaces of the insulation spacers 47a, 47b can be prevented, and accordingly the reliability of the insulation can be improved. The grounding device 52 may be arranged in any one of the main buses 4a, 4b. In this case, an insulation spacer may be horizontally arranged, and accordingly the breaker unit 13 can be made smaller in the section size and advantageous in the protection and monitoring.

In the embodiment shown in FIG. 7, a current transformer unit 12 is connected to the right-hand side of the breaker unit 13 through a flange. An isolator unit 11 of a vertical type in the line side is arranged in the current transformer unit 12 through an insulator spacer 48. The grounding device 52, the current transformer 14, the breaker unit 13 and the current transformer 12 are arranged in gas sections sectioned by the insulation spacers 47a, 47b, 48. By constructing in such a feature, the insulation spacer 48 can be disposed at a position distant from the breaker portion as far as possible to reduce an effect in the event of failure current breaking of the breaker unit 13. Further, the breaking performance can be improved by increasing an amount of gas in the breaking portion. A projecting grounding device 45 in the lower side of the main bus isolator unit 15a is horizontally arranged in the isolator unit 11 in the line side. A grounding device 44 is also arranged in the right-hand side of the isolator unit 11 in the line side and on a line extended from the breaker unit 13. A fixed electrode 121 and a movable electrode 122 composing the isolating portion are arranged inside the breaker unit 11 as to be described later, and a flange 204 is arranged at the position of the both electrodes in the isolator container of the isolator unit. Further, a voltage transformer unit 10 is arranged in the right-hand side of the line-side isolator unit 11 through an insulation spacer 49 and connected to the isolator unit 11 through a T-shaped conductor. A conductor 53 extending downward is connected to a conductor 54 having a branching portion through an insulation spacer 50. The upper portion of the conductor 54 is connected to a lightning arrester unit 9 of a vertical type through an insulator spacer 51. As shown in FIG. 7 and FIG. 8, the two buses 4a, 4b are arranged between the end of the breaker unit 13 and the end of the actuator 41, and accordingly the freedom in arranging the components in the line side can be attained.

The breaker unit 13 and the isolator unit 11 are mounted on the base 205, and the voltage transformer 10 and the lightning arrester unit 9 are mounted on the base 206. As shown in FIG. 2 and FIG. 3, I-shape steel blocks are arranged under the bases 205, 206, and the bases 205, 206 are supported by the I-shaped steel blocks 252. The I-shaped steel block 252 has a height of 250 mm. As described above, the bus connecting conductor 46 and the conductor 46a are electrically connected to each other with tulip contact, and the flange 204 is arranged in the isolator unit 11. Therefore, the breaker unit 13 and the fixed electrode 121 side of the isolator unit 11 can be detached off from each other by removing the flange after discharging the gas. Accordingly, when the breaker unit 13 needs to be removed, the breaker unit 13 can be detached by once jacking up the base 205 to remove the I-shaped steel blocks and then moving the base 205 downward. Therefore, the breaker unit 13 can be replaced in a short time in the event of a failure. Further, since the I-shaped steel blocks can be attached at the site, the height of the gas insulation switchgear during transportation is not increased. Although the embodiment is described in the case of employing the I-shaped steel blocks, it is possible to use any members capable of being jacked down instead of the I-shaped steel blocks.

FIG. 8 is another embodiment of a gas insulation switchgear used for a transmission line of which the portion from the main buses 4a, 4b to the isolator unit 11 in the line side is constructed similar to the embodiment of FIG. 7. In the embodiment of FIG. 8, a cable head 40 is connected to the isolator unit 11 in the line side through an insulation spacer 49. The cable head 40 is arranged in a level lower than the conductor. A vertical type arrester unit 9 is connected to the cable head 40 through an insulation spacer 55. A voltage transformer unit 10 is connected to the upper portion of the lightning arrester unit 9 through an insulation spacer.

By constructing as described above, the two main buses and the two main isolator units can be horizontally arranged above the breaker unit 13 and the actuator 41, and the individual phase lines are constructed from the three-phase single-unit main buses. Therefore, the outer diameter of the breaker unit can be made small and the outer diameter of the main isolator unit can be also made small, and accordingly the height of the gas insulation switchgear can be reduced. Further, the vertical type isolator in the line side is connected to the breaker arranged in the lower level position, the levels of the voltage transformer unit 10, the lightning arrester unit 9 and the cable head can be also suppressed to a level equal to the level of the main bus isolator unit. When the breaker unit 13 needs to be removed, the breaker unit 13 can be detached by moving the flange after discharging the gas. Therefore, the breaker unit 13 can be replaced in a short time in the event of a failure.

FIG. 9 to FIG. 14 show the details of the main bus isolator unit 15. The bus isolator unit portion 60 is formed in the bus connecting conductor 46 side of the main bus isolator unit 15, and the conductors 63, 64 and 65 are arranged in the side opposite to the bus connecting conductor 46, and the mechanism portion 61 is arranged in the side opposite to the bus isolator unit 60 with respect to these conductors. Insulation spacers 66 for fixing and supporting the conductors 63, 64, 65 for three phases together are arranged in the both ends of a bus container 62. The conductors 63, 64, 65 are respectively arranged at vertexes of a triangle, and the conductors 63 and 64 are arranged in the bus connecting conductor 46 side and the conductor 65 is arranged in the mechanism portion 61 side. It can be understood from comparing FIG. 8 with FIG. 24 that even if connection of the buses becomes inverse, the connection can not become difficult since the vertex direction of the triangle is changed. Therein, although it is described that the conductors 63, 64, 65 are arranged in the triangular shape, the conductors may be arranged in a line.

The bus isolator unit 60 is formed of isolator containers 74 separated individually to three phases in a direction perpendicular to the axis line of the bus container 62 or branching portions of the bus container 62, and branched conductors of the conductors 63, 64, 65 are individually arranged in the isolator containers 74. An insulation spacer 67 for fixing and supporting the branched conductor for one phase is arranged in each of the isolator containers 74 to keep sealing of the main bus isolator unit 15. A fixed side conductor 68 is attached to the insulation spacer 67 to form a fixed contact 69. The fixed side conductor 68 is arranged in the center line portion of the isolator container 74. On the other hand, the mechanism portions 61 are respectively arranged in mechanism portion containers 70, and a link 75 of the mechanism portion 61 is connected to an actuator arranged outside the mechanism portion container 70. A movable contact is connected to the link 75 through an insulation rod 71.

A movable side conductor 73 is arranged on the central axis of the isolator container 74 and opposite to the fixed side conductor 68. As shown in FIG. 12 to FIG. 14, the conductors 63, 64, 65 are respectively connected to the movable side conductors 73 by branch conductors. A through hole is formed in the central portion of the movable side conductor 73. As shown in FIG. 10, the conductor 65 has through holes for three phases formed at positions corresponding to the through holes formed in the movable side conductor 73, and the portions of the through holes being formed have locally thick portions 76 in order to secure current conduction capacity. As described above, each of the movable conductors 73 connected to the conductor 63 or 64 is formed so as to come to the center line portion of the isolator container 70 by the locally thick portion 76, and the insulation rod 71 for driving the movable contact 72 to electrically connect or disconnect the conductor 63 or 64 with or from the fixed side conductor 68 is formed so as to be moved through the through hole formed in the conductor 65 which is for the other phase. The insulation rod 71 for driving the movable contact 72 to electrically connect or disconnect the conductor 65 with or from the fixed side conductor 68 is formed so as to be moved through the through hole formed in the conductor 65. Further, the insulation rod 71 and the movable contacts 72 connected to the insulation rod 71 are moved through the through hole formed in the movable side conductor 73, and the movable side conductor 73 can be electrically connected to and disconnected from the fixed contact 69.

By constructing as described above, the insulation rods driving the movable contacts electrically connecting and disconnecting the conductors for two phases to and from the fixed side conductors are constructed so as to be moved through the through holes formed in the conductor for the other phase. Therefore, the operating mechanism portions can be arranged in the side opposite to the bus isolation unit portion 60 with respect to the conductors 63 to 65. Further, the links 75 for three phases can be horizontally arranged in nearly an equal level, and the operating mechanism can be made simple in structure. Further, since the through holes for three phases are formed in the conductor in the mechanism portion side, it is possible to increase freedom in that the movable contacts can be formed large in size, and that the movable side conductors can be formed large in size.

The driving mechanism of the link 75 attached to the insulation rod 71 will be described below in detail, referring to FIG. 16 to FIG. 19. A mechanism portion container 80 containing the link 75 is arranged in the side opposite to the main bus insulator of the bus container 62. As shown in FIG. 16, FIG. 17 and FIG. 18, a cylindrical container portion 81 is attached to the bus container 62 with welding or the like, and a flange 82 is attached to the cylindrical container portion 81. A flange 83 is arranged in the mechanism portion container 80, and the mechanism portion container 80 is attached to the bus container 62 by fixing the flanges 82, 83 with bolts through a sealant. The mechanism portion container 80 is formed in a rectangular or an elliptical cross section, and the link 75 and the insulation rod are arranged in the longer portion of the cross section. The insulation rod 71 and the link 75 are rotatably connected to a connecting portion 87. A curvilinear hole is formed in the connection portion of the link 75, and the connection portion of the insulation rod 71 is moved inside the hole to move the insulation rod 71 straight. A hole 85 to be inserted with an axis 84 is formed in the link 75, the axis 84 is arranged penetrating through the holes 85 for three phases.

Clamps 85, 86 having a sealant are attached outside the mechanism portion container 80 with bolts to seal and rotationally support the axis 84. An inspection window 88 is formed at a position corresponding to the connecting portion 87 of the mechanism portion container 80, and a sealing plate 89 is fixed to the inspection window 88 with bolts through a sealant. As shown in FIG. 15, the actuators 42, 43 are attached to one ends of the axis 84 attached to the main isolator units 4a, 4b, respectively, and the actuators 42, 43 are arranged in the same direction in the embodiment shown in FIG. 15.

The mechanism portion of the grounding device 52 is also constructed similarly to the mechanism portion of the main isolator unit described above. As shown in FIG. 7 and FIG. 8, a flange is arranged in the container of the upper portion of the bus connecting conductor 46, and this flange is connected to a flange arranged in the mechanism portion container 90 of the grounding device 52 with bolts through a sealant. Although the mechanism portion container 90 is constructed similar to the mechanism portion container 80, the actuator is arranged at a position opposite to the actuators 42, 43.

The links 75 for three phases can be connected with the single axis formed in a unit or formed by connecting rods together because the links are horizontally arranged in the nearly equal level as described above. Further, adjusting work of connecting the links for three phases can be saved because the link mechanisms for three phases are connected with the single axis.

The current transformer unit 12 is constructed as follows. A current transformer shown in FIG. 19 is an external mount type, and a current transformer shown in FIG. 20 is an internal mount type. Although the current transformer of the external mount type is shown in FIG. 7 and FIG. 8, the current transformer of the internal mount type may be employed.

The current transformer unit 12 is composed of a current transformer case 101, a current transformer 100 and an insulation plate 102 arranged between an insulation spacer 48 in the outer peripheral side of the conductor 103 connected by the tulip contact 104 and a flange portion 108 of the container. The current transformer unit 12 is formed in a unit different from the breaker unit 13. By forming the current transformer unit 12 in the different unit, the isolator unit 11 can be directly connected to the breaker unit when the current transformer unit can be omitted. Further, the current transformer unit 12 can be easily replaced in the event of failure. A protective cover 105 is arranged in the outer periphery of the current transformer case 101. The current transformer 100 is fixed by a clamp arranged in the insulation plate 102, and the shape is formed so as to be large in the outer diameter and small in the width.

Since the current transformer unit 102 is formed as described above, the length of the transformer unit can be shortened and the lead wire can be extracted to the outside through the protective cover.

The current transformer unit of the internal mount type is composed of a current transformer case 106 arranged in the outer peripheral side of the conductor between an insulation spacer 48 and a flange 108, a current transformer 100 arranged in the inner peripheral side of the current transformer case 106, and a clamp 109 for fixing the current transformer 100 arranged in the current transformer case 106. A hermetic seal terminal port 107 is arranged in the current transformer case 106 to extract the lead wire of the current transformer 100. The current transformer 100 is formed so as to be small in the outer diameter and large in the width.

Since the current transformer unit is formed as described above, the outer diameter of the current transformer unit can be made small though the length is not short. Therefore, the bolts can be easily screwed when the current transformer unit is mounted. Further, number of the parts can be reduced.

Although the current transformer unit 12 has been described above, the current transformer unit 14 is connected to the container instead of the insulation spacer 48. Further, the current transformer unit 12 may be formed together with the breaker unit 13 in a unit.

The structure of the isolator unit 11 will be described below in more detail, referring to FIG. 21 to FIG. 23. Cylindrical containers 112 and 111 are arranged in the upper portion and the lower portion of the isolator unit 11 in a direction perpendicular to the axis line of the isolator container 110. One side of the container 111 is connected to the insulation spacer 48 of the current transformer unit 12, and the other side is connected to the mechanism portion container 114 of the grounding device 44 through a flange. One side of the container 112 is connected to the mechanism portion container 115 of the grounding device 45 through a flange, and the other side is connected to the insulation spacer 49 through a flange. The upper portion of the isolator container 110 is connected to the mechanism portion container 116 of the isolator.

A fixed electrode 118 of the grounding device 44 is arranged in a conductor 117 fixed to and supported by the insulation spacer 48 in a direction of the axis line, and a fixed electrode 121 of the isolator is arranged in a direction of the axis line of the isolator container 110. A grounding bar 120 fixed by a hermetic seal terminal is attached to the mechanism portion container 114, and formed so as to be in contact with a movable electrode 119. The grounding bar 120 is grounded. The movable electrode 119 and the fixed electrode 118 are opened during normal operation, and the movable electrode 119 is brought in contact with the fixed electrode 118 to ground by operation of the actuator connected to the movable electrode 119 through a link 126 at inspection or the like.

A movable current collector is arranged in the fixed electrode 121 side in a conductor portion 130 fixed to and supported by the insulation spacer 49 attached to the container 112, and a fixed electrode 123 of the grounding device 45 is arranged in the side opposite to the insulation spacer 49 in the direction of the axis line of the container 112. As shown in FIG. 22 and FIG. 23, a grounding bar 131 is attached to the upper portion of the conductor portion 130 through an insulator. A through hole is formed in the conductor portion 130 so that a movable electrode 122 of the isolator connected to the grounding bar through the insulation rod is reciprocally moved. A link 128 is connected to the insulation rod with a connecting portion 129.

A grounding bar 125 sealed by a hermetic seal terminal is attached to the mechanism portion container 115, and constructed so as to be in contact with a movable electrode 124. The grounding bar 125 is grounded. The movable electrode 124 and the fixed electrode 123 are opened during normal operation, and the movable electrode 124 is brought in contact with the fixed electrode 123 to ground by operation of the actuator connected to the movable electrode 124 through a link 127 in the event of failure or the like. The operating mechanism portion connected to the link is constructed as follows. Although FIG. 22 and FIG. 23 show the case where the operating mechanism portion is attached to the mechanism portion container of the isolator, the grounding devices 44, 45 are also constructed similarly.

A flange is arranged in the mechanism container 116, and the mechanism portion container 116 is attached to the isolator container 110 by fixing the flanges together with bolts through a sealant. The mechanism portion container 116 is formed in a rectangular cross section, and the link 128 and the insulation rod are arranged in the longer side portion. The insulation rod and the link 128 are rotatably connected each other with a connecting portion 129. A hole to be inserted with an axis 132 is formed in the link 128, and the axis 132 is attached by penetrating through the holes of the links 128 for three phases. Conductors for three phases are arranged in parallel to one another inside the container, and one of the conductors for three phases is arranged on the center line of the container. Each of the operating axes for three phases of the isolators is arranged on the center axis of the container in a direction perpendicular to these conductors for three phases, and the electrode gaps are arranged at one ends and the operating mechanism portions are arranged at the other ends interposing the conductors disposed on the center lines of the containers.

Since the grounding device is horizontally arranged on the horizontally extending line of the breaker unit and above the current transformer unit, the space can be effectively used and the isolators can be also arranged.

Clamps 133, 134 having a sealant are attached to the outer side of the mechanism portion container 116 to seal and rorarably support the axis 132. An inspection window is arranged at a position corresponding to the connecting portion of the mechanism portion container 116, and a seal plate is fixed to the mechanism portion container 116 with bolts through a sealant. The actuator is attached to one end of the axis 132.

The construction of the gas insulation switchgear used for a bus communication line will be described below in more detail, referring to FIG. 24. As shown in FIG. 24, a breaker unit 13 is horizontally placed in the lower side, and an actuator 41 for driving an movable contact of the breaker unit 13 is arranged in the left hand side of the breaker unit 13. A bus connecting conductor 140 is arranged above the breaker unit 13 through a current transformer unit 14 and a flange. The bus connecting conductor 140 and a conductor connected to the breaker unit 13 are electrically connected with each other by a tulip contact portion 207. There is no insulation spacer in the connecting portion of the breaker unit 13, the current transformer 14 and the bus connecting conductor 140. The bus connecting conductor 140 is fixed to and supported by insulation spacer 47b, and the grounding device 52 is connected to the upper portion of the bus connecting conductor 140 through a flange. A main bus isolator 15b is connected to the insulation spacer 47b, and an actuator 43 for operating a movable contact provided in the main bus isolator unit 15b is arranged outside the main bus isolator unit 15b. A detachable support column 208 is arranged between the main bus isolator unit 15b and the breaker unit 13. Therefore, when the breaker unit 13 is removed, the main bus 4b and the main bus isolator unit 15b can be supported by replacing the support column 208 with a column long enough to support them from the installation surface. As described above, since the insulation spacer 47b can be vertically arranged, accumulation of metallic extraneous objects in the surface of the insulation spacer 47b can be prevented, and accordingly the reliability of the insulation can be improved.

A conductor connecting unit 151 is arranged in the right hand side of the breaker unit 13 through an insulation spacer 153, and a grounding device 152 is arranged on the extending line of the breaker unit 13. The conductor connecting unit 151 is constructed in a vertical type, and the upper portion is connected to the main bus isolator unit 153 through an insulation spacer 154 to be connected to the main bus 4a. The connecting ports have the same structure in the main buses 4a, 4b. Therefore, the dimension e between the lines of the buses can be shortened. A tulip contact 210 is arranged in the conductor connection unit 151. A flange is arranged in the container portion of the outer peripheral portion of the tulip contact 210 so as to divide the conductor connecting unit 151. A detachable support column 209 is arranged in the main bus 4a.

Therefore, when the breaker unit 13 is removed, the main bus 4a and the conductor connecting unit 151 can be supported by replacing the support column 151 with a column long enough to support them from the installation surface.

The breaker unit 13 and the conductor connecting unit 151 are mounted on the base 211. I-shape steel blocks, not shown, are arranged under the base 211, and the base 211 is supported by the I-shaped steel blocks. The I-shaped steel block has a height of 250 mm. As described above, the bus connecting conductor 140 and the conductor 140a are electrically connected to each other with tulip contact, and the flange 212 is arranged in the conductor connecting unit 151. Therefore, the breaker unit 13 and the breaker unit 13 side of the conductor connecting unit 151 can be detached off from each other by removing the flange after discharging the gas. Accordingly, when the breaker unit 13 needs to be removed, the breaker unit 13 can be detached by once jacking up the base 211 to remove the I-shaped steel blocks and then moving the base 211 downward. Therefore, the breaker unit 13 can be replaced in a short time in the event of a failure.

As described above, since the main bus isolator units 15a, 15b can be arranged in a nearly equal level, the height of the gas insulation switchgear can be reduced. Since in the gas insulation switchgear in accordance with the present invention the individual phase lines are constructed from the three-phase single-unit main buses 4a, 4b, the outer diameter of the breaker unit per phase can be made small and the outer diameter of the main bus isolator units can be also made small. Therefore, the height of the gas insulation switchgear can be lowered. For example, the height of a gas insulation switchgear of even 300 kV class can be lowered to below 2 m 70 cm, and accordingly the gas insulation switchgear can be transported by a trailer in a unit. Therefore, the transportation cost can be reduced. Further, the workability can be improved because of easiness of inspection. Furthermore, since the breaker unit and the two main buses above the actuator and the main bus isolator unit can be horizontally arranged, the height of the gas insulation switchgear can be reduced.

As shown in FIG. 25, the gas insulation switchgear used for a transformer line is constructed similarly to the gas insulation switchgear shown in FIG. 7 from the main buses 4a, 4b to the current transformer unit 12. A grounding device unit 156 is connected to the current transformer unit 12 through an insulation spacer 48. A conductor 159 fixed to and supported by the insulation spacers 48 and 157 is arranged in the lower side of the grounding device unit 156, and a fixed electrode of the grounding device is arranged in the conductor 159. The conductor 159 is connected to a conductor 54 through the insulation spacer 157, and the container containing the conductor 54 is gas-sectioned with the insulation spacers 157, 158 and 51. A lightning arrester 9 of a vertical type is connected to the upper portion of the insulation spacer 51.

The bus connecting conductor 46 and the conductor connected to the breaker unit 13 are electrically connected to each other with a tulip contact portion 213. There is no insulation spacer in the connection portions of the breaker unit 13, the current transformer unit 14 and the bus connecting conductor 46. A tulip contact 214 is arranged in the conductor 54. The conductor 54 can be detached by the insulation spacer 51.

Detachable support columns 215, 216 are arranged in the main bus 4a and the main bus isolator unit 15b, respectively. Therefore, when the breaker unit 13 is removed, the main buses 4a, 4b and the main bus isolator units 15a, 15b can be supported by replacing the support columns 215, 216 with columns long enough to support them from the installation surface.

The breaker unit 13 and the conductor 159 and the conductor 54 are mounted on the base 217. I-shape steel blocks, not shown, are arranged under the base 217, and the base 217 is supported by the I-shaped steel blocks. The I-shaped steel block has a height of 250 mm. As described above, the bus connecting conductor 46 and the conductor 46a are electrically connected to each other with tulip contact, and the insulation spacer 51 is arranged in the conductor 54. Therefore, the breaker unit 13 and the conductors 159 and 54 can be detached off from each other by removing the flange after discharging the gas. Accordingly, when the breaker unit 13 needs to be removed, the breaker unit 13 can be detached by once jacking up the base 217 to remove the I-shaped steel blocks and then moving the base 217 downward. Therefore, the breaker unit 13 can be replaced in a short time in the event of a failure.

As described above, the main bus isolator units are horizontally arranged in parallel to each other without stacking in the vertical direction to reduce the height of the gas insulation switchgear. Further, since the insulation spacers 47a, 47b can be vertically arranged, accumulation of metallic extraneous objects in the surfaces of the insulation spacers 47a, 47b can be prevented, and accordingly the reliability of the insulation can be improved.

According to the gas insulation switchgear of the present embodiment, as described above, since the main bus isolator units 15a, 15b having the mechanism portion arranged horizontally can be connected to the both sides of the bus container containing the bus connecting conductor 46, the height of the gas insulation switchgear can be reduced. Particularly, the height of a gas insulation switchgear of even 300 kV class can be lowered to below 2 m 70 cm, and accordingly the gas insulation switchgear can be transported by a trailer in a unit. Further, when the isolator is horizontally arranged in the conventional structure of the movable contact of the isolator, the insulation spacer must be arranged horizontally. Therefore, there is a problem in that, metallic extraneous objects are accumulated on the insulation spacer and the insulating performance is deteriorated to decrease the reliability. However, according to the gas insulation switchgear of the present embodiment, since the insulation spacers can be vertically arranged even when the isolator unit is horizontally arranged, the insulating performance can be improved. Further, in the conventional gas insulation switchgear, the heights of the transmission line, the bus communication line, the bus section line and the transformer line are different from one another. However, in the gas insulation switchgear of the present embodiment, the heights of the transmission line, the bus communication line, the bus section line and the transformer line can be nearly equal to one another, and each of the transmission line, the bus communication line, the bus section line and the transformer line can be transported in a unit.

Further, since the main bus isolator units 15a, 15b are horizontally arranged in the upper portion, workability of the installation work and inspection work can be improved. Furthermore, since the heavy weight breaker can be arranged in the lower position, the seismic resistance can be improved.

In the gas insulation switchgear of the present embodiment, the lengths of the transmission line, the bus communication line, the bus section line and the transformer line can be shortened including the voltage transformer unit and so on because the two main bus and the main bus isolator unit are arranged above the breaker unit and the actuator. Since the length of the bus communication line can be shortened, the position connecting the bus to the transformer can be placed near the gas insulation switchgear.

Further, the bus communication line and the bus section line can be made similar to each other in construction, and the transmission line and the transformer line can be also made similar to each other in construction. Therefore, the commonality of system construction can be attained. In addition, since the distance between the two lines of the main buses 4a and the distance between the two lines of the buses 4b can be decreased, the total length of the system can be shortened. As a result, the gas insulation switchgear of a high voltage of 300 kV can be installed within an area of about 13 m width and about 30 m length.

Furthermore, since the buses from the bushings and the buses connecting to the transformer can be arranged in the low-level position, the installation work can be easily performed and the seismic resistance can be improved.

Figure 26:
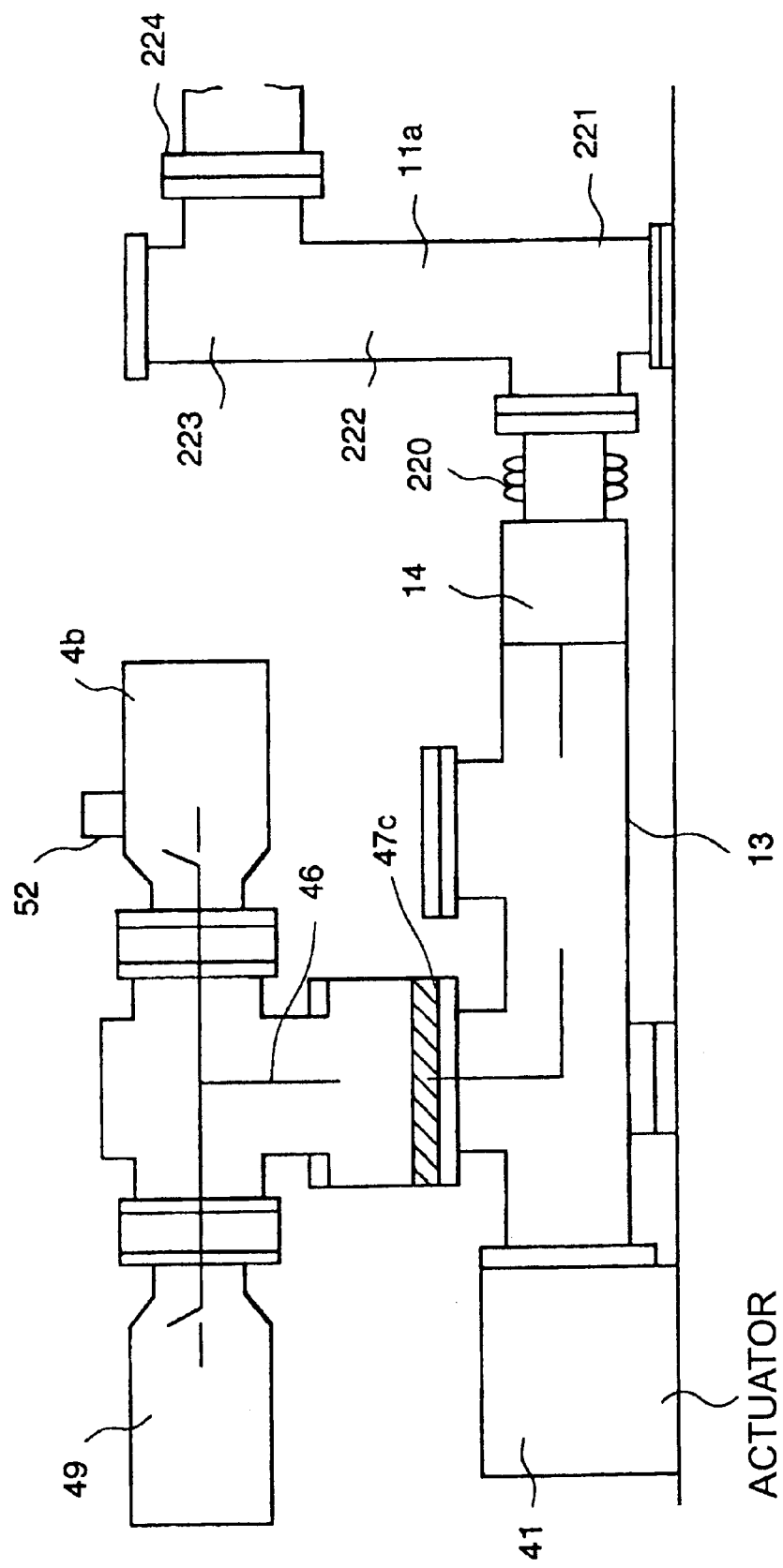
FIG. 26 is a front view showing another embodiment of a gas insulation switchgear used for an electric power transmission line in accordance with the present invention.

Another embodiment of the present invention will be described below, referring to FIG. 26. FIG. 26 is a front view showing a gas insulation switchgear used for a transmission line. Although the gas insulation switchgear of the present embodiment is constructed similarly to the embodiment shown in FIG. 7, in the present embodiment the conductors 63, 64, 65 of the main buses 4a, 4b are vertically or horizontally aligned in a line. A grounding device 52 is arranged in either of the main bus 4a or the main bus 4b, and there is no grounding device in the bus connecting conductor 46. An insulation spacer 47c horizontally is arranged in a flange connecting portion between the breaker unit 13 containing the breaker portion inside an integrated tank and the current transformer 14. The current transformer 12 is connected to the isolator unit 11a through a bellows 220. The isolator unit 11a employed is of a vertical type, and grounding devices 221 and 223 are arranged in the lower portion and the upper portion and an isolator 222 is arranged in the middle portion. The isolator unit 11a is constructed similarly to the construction described in FIG. 9 to FIG. 14. The grounding device 223 arranged in the upper portion is connected to a lightning arrester unit 9 through an insulation spacer 224.

By constructing as described above, the two main buses and the main bus isolator units can be horizontally arranged above the breaker unit 13 and the actuator 41, and the individual phase lines are constructed from the three-phase single-unit main buses. Therefore, the outer diameter of the breaker unit can be made small, and the outer diameter of the main bus isolator unit can be made small, and the height of the gas insulation switchgear can be reduced. In this case, the insulation spacer may be horizontally arranged, and accordingly the section of the breaker unit 13 can be made small and it becomes advantageous in the aspect of protection and monitoring. Further, the insulation rods driving the movable contacts electrically connecting and disconnecting the conductors for two phases to and from the fixed side conductors are constructed so as to be moved through the through holes formed in the conductor for the other phase. Therefore, the operating mechanism portions can be arranged in the side opposite to the bus isolation unit portion with respect to the conductors 63 to 65. Further, the links for three phases can be horizontally arranged in nearly an equal level, and the operating mechanism can be made simple in structure. Further, since the through holes for three phases are formed in the conductor in the mechanism portion side, it is possible to increase freedom in that the movable contacts can be formed large in size, and that the movable side conductors can be formed large in size.

Another embodiment of the present invention will be described below, referring to FIG. 27 and FIG. 28. Each of FIG. 27 and FIG. 28 is a vertical cross-sectional view showing the structure of a gas insulation switchgear in which the main buses are arranged in the lower position.

Figure 27:
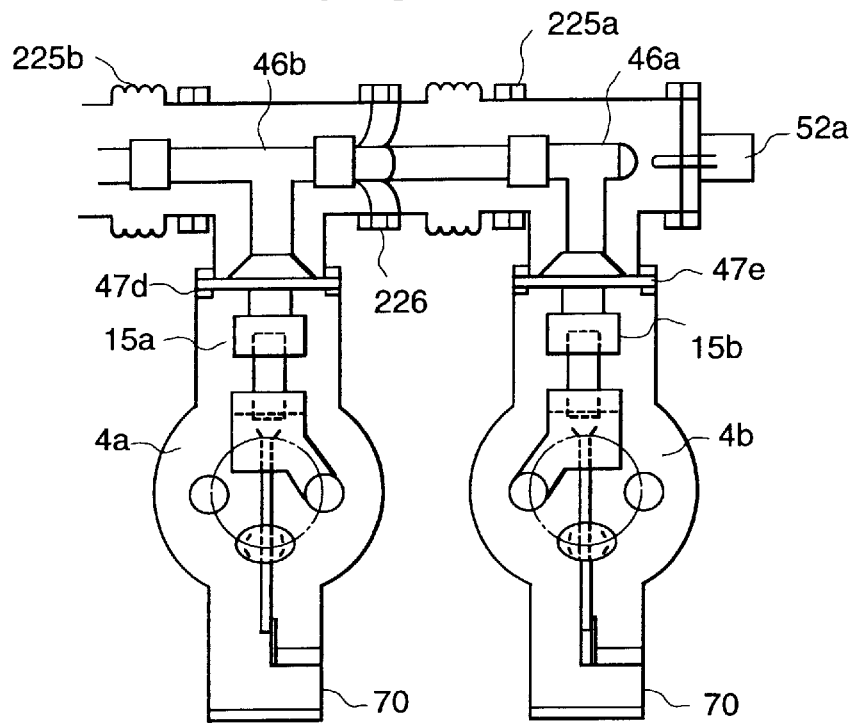
FIG. 27 is a longitudinal sectional view showing the structure of another embodiment of a gas insulation switchgear in accordance with the present invention when the main buses are arranged below.

In the embodiment shown in FIG. 27, the main bus isolator units 15a, 15b shown in FIG. 9 to FIG. 14 are connected to the three-phase single-unit main bus 4a and the three-phase single-unit main bus 4b. Operating mechanism containers 70 are arranged in the lower position, and insulation spacers 47d, 47e are attached to flange connecting portions with bus connecting conductors 46a, 46b. A grounding device 52a is arranged in an end portion of the bus connecting conductor 46a the bus connecting conductor 46a and the bus connecting conductor 46b are connected to each other through a bellows 225a and an insulation spacer 226, and the bus connecting conductor 225b is connected to a current transformer unit, not shown, through a bellows 225b. An isolator unit 11a used is of a vertical type, and the isolator unit 11a is constructed similarly to the construction described in FIG. 9 to FIG. 14.

Figure 28:
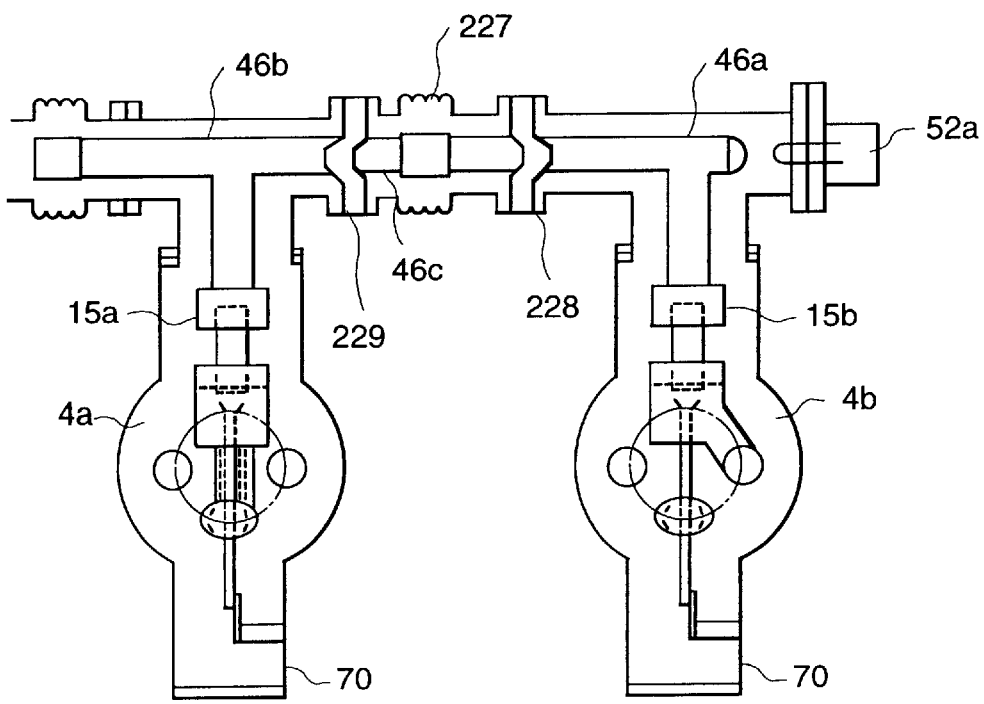
FIG. 28 is a longitudinal sectional view showing the structure of another embodiment of a gas insulation switchgear in accordance with the present invention when the main buses are arranged below.

Although the embodiment of FIG. 28 is constructed similarly to the embodiment of FIG. 27, in the embodiment of FIG. 28 a bus connection conductor 46c having a bellows 227 is interposed between the bus connection conductor 46a and the bus connection conductor 46b, and the bus connecting conductor 46a is connected to the bus connecting conductor 46c through an insulation spacer 228, and the bus connecting conductor 46c is connected to the bus connecting conductor 46b through an insulation spacer 229.

By constructing as described above, the insulation rods driving the movable contacts electrically connecting and disconnecting the conductors for two phases to and from the fixed side conductors are constructed so as to be moved through the through holes formed in the conductor for the other phase. Therefore, the operating mechanism portions can be arranged in the same side opposite to the bus isolation unit portion with respect to the conductors 63 to 65. Further, the links for three phases can be horizontally arranged in nearly an equal level, and the operating mechanism can be made simple in structure. Further, since the through holes for three phases are formed in the conductor in the mechanism portion side, it is possible to increase freedom in that the movable contacts can be formed large in size, and that the movable side conductors can be formed large in size.

INDUSTRIAL APPLICATION

According to the present invention, since the individual phase lines are constructed from the three-phase single-unit main buses 4a, 4b, the outer diameter of the breaker unit can be made small, and the outer diameter of the main bus isolator unit can be made small, and the height of the gas insulation switchgear can be reduced.

Further, since the main bus isolator units can be connected to the both sides of the bus container, the height of the gas insulation switchgear can be lowered.

Further, since the insulation spacer is not horizontally arranged even if the breaker unit is horizontally arranged, the reliability of insulation can be improved.

What is claimed is:

1. A gas insulation switchgear, comprising:

a breaker unit arranged horizontally and containing a conductor for one phase in a container;

a bus side connecting conductor arranged vertically with respect to said breaker unit and connected to said breaker unit;

three-phase single-unit main bus units arranged on both sides of said bus side connecting conductor and extending in a same direction as said breaker unit;

an isolator arranged between a bus conductor of said main bus unit and said bus side connecting conductor; and an operating rod for operating opening and closing of electrodes of said isolator and a mechanism portion for transmitting a driving force to said operating rod;

said isolator being arranged on one side of said bus conductor and said mechanism portion being arranged on the opposite side of said bus conductor, and said isolator, said operating rod and said mechanism portion for each individual phase being aligned in a row, wherein the isolator mechanism portion for driving said operating rod is arranged to extend through said main bus unit.

2. A gas insulation switchgear, comprising:

a breaker unit arranged horizontally and containing a conductor for one phase in a container;

a bus side connecting-conductor arranged vertically with respect to said breaker unit and connected to said breaker unit;

three-phase single-unit main bus units arranged on both sides of said bus side connecting conductor and extending in a same direction as said breaker unit;

an isolator arranged between a bus conductor of said main bus unit and said bus side connecting conductor; and an operating rod for operating opening and closing of electrodes of said isolator and a mechanism portion for transmitting a driving force to said operating rod;

said isolator being arranged on one side of said bus conductor and said mechanism portion being arranged on the opposite side of said bus conductor, and said isolator, said operating rod and said mechanism portion for each individual phase being aligned in a row,
wherein said operating rod penetrates through said bus conductor of said main bus unit.

3. A gas insulation switchgear comprising:
a breaker unit arranged horizontally and containing a conductor for one phase in a container;
a first connecting conductor arranged vertically with respect to said breaker unit and connected to one of connecting ports of said breaker unit;
a first three-phase single-unit main bus connected to said first connecting conductor;
a second connecting conductor connected to an other of the connecting ports of said breaker unit;
a second three-phase single-unit main bus connected to said second connecting conductor,
a first isolator for connecting a bus conductor of said first main bus to said first connecting conductor;
a first operating rod for operating opening and closing of electrodes of said first isolator and a first mechanism portion for transmitting a driving force to said first operating rod;
a second isolator for connecting a bus conductor of said second main bus to said second connecting conductor; and
a second operating rod for operating opening and closing of electrodes of said second isolator and a second mechanism portion for transmitting a driving force to said first operating rod, wherein
the connecting port to said first main bus of said first connecting conductor and the connecting port to the second main bus of said second connecting conductor are arranged in the same direction,
said first isolator is arranged on one side of said first main bus, said first mechanism portion is arranged on an opposite side of said first main bus,
said second isolator is arranged on one side of said second main bus, said second mechanism portion is arranged on an opposite side of said second main bus,
said first isolator, said first operating rod and said first mechanism portion for each individual phase being aligned in a row,
said second isolator, said second operating rod and said second mechanism portion for each individual phase being aligned in a row.

4. A gas insulation switchgear according to claim 3, wherein said first isolator mechanism portion driving said first operating rod is arranged in the side opposite to said first isolator through said first main bus unit, and said second isolator mechanism portion driving said second operating rod is arranged in the side opposite to said second isolator through said second main bus unit.

5. A gas insulation switchgear comprising:
plural-phase conductors arranged in a container;
isolators for specified phases of said plural-phase conductors; and
operating rods for operating opening and closing of electrodes of each said isolator, wherein
said operating rod penetrates through one conductor of a phase other than said specified phases.

6. A gas insulation switchgear comprising:
a main bus isolator for opening and closing a main bus;
a main bus conductor connected to said main bus isolator;
a bus container containing said bus conductor for each of three phases;
an isolator driving portion arranged in a side opposite to said main bus isolator through said main bus container;
a fixed electrode arranged in said main bus isolator, said fixed electrodes for three phases being aligned in a row;
through holes for three phases formed in said main bus conductor for one phase; and
an operating rod operated by said isolator drive portion by being moved through said through hole.

7. A gas insulation switchgear, comprising:
three-phase conductors arranged in a container;
an isolator for each phase of said three-phase conductors in said container; and
a mechanism portion for operating an operating rod of each said isolator, wherein
one of said three-phase conductors is arranged on a center line of said container, said operating rods of said isolators for individual phases being arranged on a central axis of said container, electrodes of said isolators being arranged in one end of said container, said mechanism portions being arranged in the other end, and said conductors being interposed between said electrodes and said mechanism portions, and
wherein a portion of said bus conductor to be penetrated by said operating rod is formed thick.

8. A gas insulation switchgear according to claim 3, wherein said first operating rod penetrates through said first bus conductor of said first main bus unit, and said second operating rod penetrates through said second bus conductor of said second main bus unit.

* * * * *